(12) United States Patent
Crane, III et al.

(10) Patent No.: US 9,524,268 B2
(45) Date of Patent: Dec. 20, 2016

(54) VESTIBULAR DYNAMIC INCLINOMETER

(71) Applicant: University of Florida Research Foundation, Inc., Gainesville, FL (US)

(72) Inventors: Carl D. Crane, III, Gainesville, FL (US); Vishesh Vikas, Cambridge, MA (US)

(73) Assignee: University of Floria Research Foundation, Inc., Gainesville, FL (US)

( * ) Notice: Subject to any disclaimer, the term of this patent is extended or adjusted under 35 U.S.C. 154(b) by 798 days.

(21) Appl. No.: 13/665,872

(22) Filed: Oct. 31, 2012

(65) Prior Publication Data

US 2013/0158940 A1 Jun. 20, 2013

Related U.S. Application Data

(60) Provisional application No. 61/553,803, filed on Oct. 31, 2011.

(51) Int. Cl.
*G06F 17/00* (2006.01)
*G01C 9/02* (2006.01)

(52) U.S. Cl.
CPC ............ *G06F 17/00* (2013.01); *G01C 9/02* (2013.01)

(58) Field of Classification Search
CPC .................................. G01C 9/02; G06F 17/00
See application file for complete search history.

(56) References Cited

U.S. PATENT DOCUMENTS

| 3,310,985 | A | * | 3/1967 | Belsterling | G01P 15/038 |
| | | | | | 137/804 |
| 5,850,289 | A | * | 12/1998 | Fowler | G01B 11/08 |
| | | | | | 250/559.22 |
| 2005/0110448 | A1 | * | 5/2005 | Takenaka et al. | 318/568.12 |
| 2008/0249740 | A1 | * | 10/2008 | Verhaert | 702/160 |

FOREIGN PATENT DOCUMENTS

SG 117414 * 1/2007

OTHER PUBLICATIONS

Vishesh Vikas et al., "Balancing Robots using Vestibular Dynamic Inclinometer", Florida Conference on Recent Advances in Robotics, FCRAR 2010, Jacksonville, Florida, May 20-21, 2010.*

(Continued)

*Primary Examiner* — Alexander Satanovsky
(74) *Attorney, Agent, or Firm* — Timothy H. Van Dyke; Beusse, Wolter, Sanks & Maire, PLLC

(57) ABSTRACT

A method of determining orientation parameters of a rigid body, including: associating at least two multi-axis accelerometers with the rigid body, wherein the body has a base end, a distal end, and a line of symmetry between the base end and the distal end. The two first multi-axis accelerometers are disposed at a first point along the line of symmetry between the base end and the distal end. Each first multi-axis accelerometer is disposed at equal distances from the line of symmetry. The line of symmetry and both first multi-axis accelerometers lie in a first plane. The method further includes: associating a gyroscope with the body at the first point, equally between both first multi-axis accelerometers; gathering measured data from the two first multi-axis accelerometers and the gyroscope; and applying analysis free of calculus to determine a first inclination angle, of the body from a stable orientation.

18 Claims, 24 Drawing Sheets

(56) References Cited

OTHER PUBLICATIONS

Vikas, V. et al., "Measurement of robot link joining parameters using multiple accelerometers and gyroscope", ASME International Design Engineering Technical Conference, Aug. 2013.
Vikas, V. et al., "Dynamic Inclination Measurement for five degrees-of-freedom robots", IASTED International Conference on Robotics, Nov. 2011.
Vikas, V. et al., "Inclination Parameter Estimation for Manipulator and Humanoid Robot Links", ASME International Design Engineering Technical Conference, Aug. 2011.
Vikas, V. et al., "Inclination Estimation and Balance of Robot using Vestibular Dynamic Inclinometer", IEEE-RAS International Conference on Humanoid Robots, Dec. 2010, pp. 245-250.
Vikas, V. et al., "Robot Inclination Estimation using Vestibular Dynamic Inclinometer", IASTED Inernational Conference Robotics and Applications, vol. 706, Nov. 2010.
Vikas, F, "Vestibular Dynamic Inclinometer and Measurement of Inclination Parameters", A Dissertation presented to the Graduate School of the University of Florida, 2011.

* cited by examiner

VESTIBULAR DYNAMIC INCLINOMETER

FIELD OF THE INVENTION

The invention is related to measurement of the inclination parameters of a body. More specifically, the invention is related to a new apparatus and method used to determine the inclination parameters of a body using strategically placed multiple inertial sensors i.e. multi-axis linear accelerometers and a gyroscope.

BACKGROUND OF THE INVENTION

Inclination parameters of a body, including an inclination angle from a reference, angular velocity, angular acceleration and magnitude of acceleration of the surface of contact, may be used, for example, in robotics applications. Inclination angles are very useful feedback parameters for robotics applications, biomechanical applications (gait analysis), biomedical applications, etc.

In the absence of non-gravity acceleration, a tri-axial accelerometer can be used to measure the inclination angle of a body (e.g. as an inclinometer). For this static case, an algorithm measures the angle between the sensor unit with respect to the direction of the force of gravity. However, this technique will be less accurate when there are relatively large non-gravity accelerations. Furthermore, linear acceleration does not give complete information about all of the inclination parameters.

Gyroscopes are used to measure angular velocity. Strapdown integration algorithms estimate the change in inclination angle by integrating the angular velocity to determine relative movement of the body. The word strapdown indicates that the angular velocity is obtained from the gyroscope strapped onto an object. However, small errors in angular velocity (gyroscope signal) will give rise to large integration errors. Moreover, for measuring absolute inclination parameters as opposed to a change in inclination parameters, reference inclination parameters must to be set.

Orientation estimation is also done by fusion of accelerometer and gyroscope data. Such sensors are called Inertial Measurement Units (IMUs). A conventional IMU practice is to use three single-axis accelerometers and three single-axis gyroscopes aligned orthogonally. The IMUs fuse accelerometer and gyroscope data to estimate inclination parameters. Estimation algorithms, e,g, Kalman Filter, with knowledge of (error) dynamics of the system are used for fusing data from different sensors. The Kalman Filter emphasizes the correctness of linear accelerations when angular accelerations are low, and emphasizes the gyroscope data more when the motion is more dynamic. The IMUs are used in field robotics, assessment of human balancing, space navigation, etc, and use linear accelerations and gyroscope data.

The human body has often been a source of motivation for mechanical design. It has inspired designs of a large number of sensors, including vision, stereo vision, haptics, etc. Mechanically, the human body displays a remarkable quality of maintaining static equilibrium for a body that is in a state of unstable equilibrium (biped stance). The human body is able to maintain equilibrium even when gravity changes (e.g. the moon, etc) and when the surface of contact is accelerating (e.g. an accelerating bus). Interestingly, in such circumstances the equilibrium position of the body changes, for example the body leans forward while sprinting and backward while trying to stop. A filter algorithm particularly for estimating the inclination parameters of human body segments has been researched. The filter uses accelerometer and magnetometer readings to obtain a low frequency component of the inclination parameters and uses the gyroscope for measuring the faster changes in the inclination parameters. However, this may be problematic as the use of magnetometer in the vicinity of ferromagnetic materials will give large errors. Another sensor unit containing a dual-axis fluid inclinometer, a dual-axis electronic compass and tri-axial gyroscope, with a Kalman filter that incorporates a continuous gyroscope offset estimate has been researched.

In humans, the balancing mechanism is based on visual and vestibular feedback to maintain the body in an unstable equilibrium biped stance. Studies show that contributions from visual, joint angle proprioceptive, and force also help in human stance control. Vision improves stance stability, but in principle, can be dispensed with. Biomechanics of the vestibular system has been investigated in detail. The human vestibular system-sensor analogy has always been drawn as single gyroscope and single accelerometer based, or using additional sensor like a magnetometer.

Sensing of inclination parameters allows for using the data to measure joint angles for humanoid robots, gait analysis, fall evaluation, balance prosthesis, etc. Joint angle measurement and inertial sensing is done using camera motion capture systems, combinations of gyroscope-accelerometers-magnetometers.

Camera based motion capture systems are obtrusive and expensive. It is also difficult to be integrated into a modern medical system, such as portable medical device and point-of-care (POC) medication. Alternately, joint angle measurement may utilize magnetic rotary encoders, optical rotary encoders, and/or micro electromechanical sensors (MEMS) including accelerometers and gyroscopes. Magnetic encoders are low-cost, contactless and reliable but require special magnet coupling alignment and magnetic shielding. Optical encoders are very accurate and contactless, but are expensive and are sensitive to environmental influences (shock, vibration, etc.). These sensors must be installed at the joint center, but this may be problematic (or impossible) for some applications, e.g. human knee joints. Small and versatile MEMS related techniques utilize accelerometers and gyroscopes, together with algorithms, in a variety of different ways to estimate inclination parameters of the body. Unlike the conventional sensors, techniques utilizing MEMS accelerometers and/or gyroscopes do not require tight coupling of the sensors to relative mechanical movements, and thus are more flexible at the point of installation, more reliable, and last longer.

Techniques using combinations of gyroscope and accelerometers on robot links can be listed as CMR with gyro-integration (CMRGI), CMR with gyro-differentiation (CMRGD) and distributed CMR (DCMR). The CMRGI and CMRGD use one dual-axis linear accelerometer and one single-axis gyroscope per link for joint angle estimation. The CMRGI integrates the gyroscope signal to estimate the change in inclination angle. This method faces problems due to integration error/drift due to noise. The CMRGD differentiates the gyroscope signal to estimate angular acceleration. It uses the angular acceleration and angular velocity to estimate the acceleration of the joint, then estimates the joint angle. Due to noise, the differentiation of angular velocity to angular acceleration has undesirable errors. The DCMR method uses two dual-axis linear accelerometers per link to estimate the joint angle. Here the difference of the two acceleration signals per link is used to measure the joint angle, thus, avoiding the errors faced by other CMR methods. In this case, the accelerometers have to be theoretically placed along the line joining the two joints, also this method is not able to estimate/measure the base angle (angle of a moving link from the ground e.g. angle of tibia w.r.t gravity when human is walking). Finally, this method does not work when the joint between two links is not revolute.

DETAILED DESCRIPTION OF THE INVENTION

Figure 1:
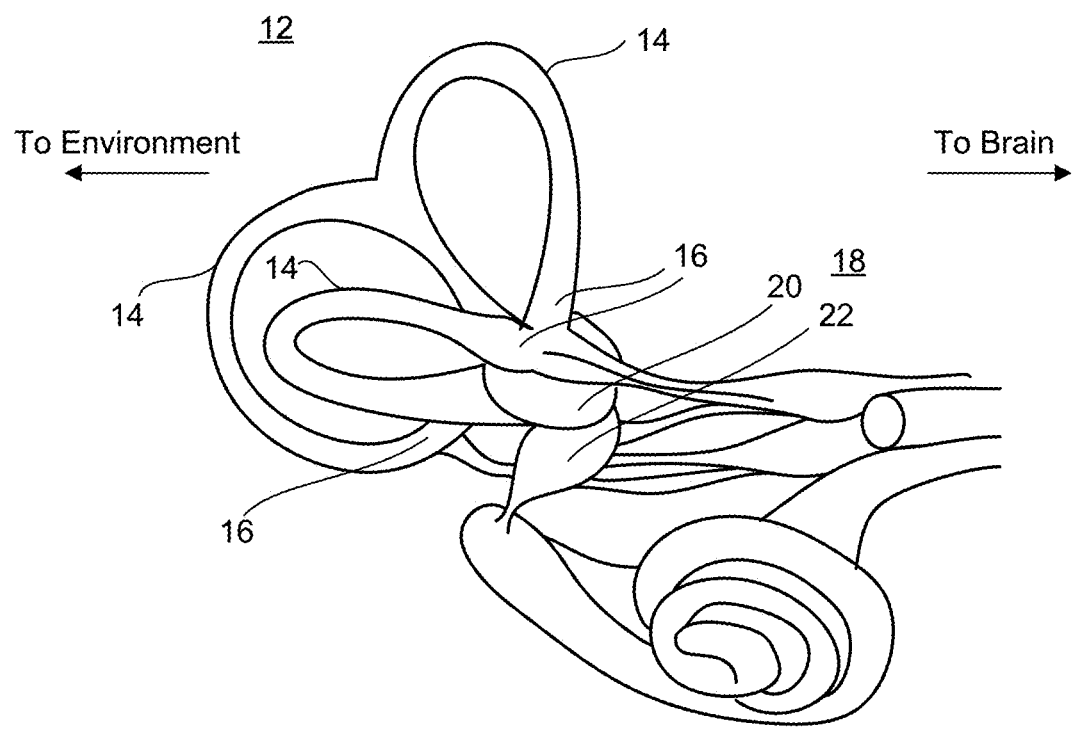
FIG. 1 is a schematic drawing of a human vestibular system.

Novel inertial sensing sensors and method of determining inclination parameters of a body are presented. Inclination parameters of a body are defined herein as the inclination angle from a reference, angular velocity, angular acceleration and magnitude of acceleration of the surface of contact. A Vestibular Dynamic Inclinometer (VDI), disclosed herein, measures the inclination parameters for two degrees of freedom robot and can be extended to measure joint parameters for links moving in a plane i.e. links joined by revolute joint or the base link. A planar Vestibular Inclinometer (pVDI), also disclosed herein, measures the inclination parameters of five degrees of freedom robots. It can also be used to measure joint parameters for links joined by a universal joint and a moving base link in contact with a ground surface. The VDI And pVDI are motivated by a complete different analogy of the human vestibular system-sensor—multiple multi-axis linear accelerometers (two or four) and a multi-axis gyroscope.

The Vestibular Dynamic Inclinometer includes a combination of two multi-axis accelerometers, (in an exemplary embodiment the multi axis accelerometers are dual-axis accelerometers), and a single-axis gyroscope. It is motivated by the human vestibular system, and can directly measure the inclination parameters without any estimation. The inclination parameters include inclination angle, angular velocity, and angular acceleration, as well as a magnitude of resultant acceleration acting of a contact surface (which is no longer only the gravitational acceleration) This direct measurement avoids errors/drift associated with the prior art's use of integration/differentiation to estimate these parameters. It also does not require system dynamics to be modeled, unlike methods using estimation techniques (e.g. Kalman Filter, etc.). Using the method disclosed herein, each set of measured data is sampled over time and is unrelated to every other set of measured data. In contrast, for each inclination parameter that is estimated in the prior art, the estimated inclination parameter is based on an inclination parameter that occurred earlier in time (i.e. dynamics modeling and filtering techniques).

The inclination parameters may be used to help balance robots and is enhanced by a further concept of a Dynamic Equilibrium Axis (DEA) also introduced herein. The DEA is parallel to the resultant acceleration of the surface of contact (i.e. point O in FIG. 8). It is the axis along which the center of mass (COM) must lie in order for the body to be at equilibrium position. Uniquely, the inclination angle provided by the VDI (pVDI) sensor(s) and method(s) disclosed herein is with respect to the DEA, and thus not directly tied to gravity alone. Unlike all other methods known, the novel VDI (pVDI) sensor(s) and method(s) disclosed do not suffer from drift/integration errors present in other methods, and is independent of gravity. The computation costs are low due to the utilization of closed form solutions only. Further, the results are valid for large angles, and the sensors need not be placed exactly at the joints i.e. are flexible at point of application.

Unlike in any previous devices based on the human ear, a completely different analogy is drawn for measurement of inclination parameters for a body modeled as a planar inverted pendulum. The two parts of the vestibular organ—otolith organs and semicircular canals are interpreted as a MEMS dual-axis linear accelerometer and a MEMS single-axis gyroscope respectively. The symmetric design of the ears motivated the placement of the accelerometers—symmetrically placed across a vertical line. This novel IMU sensor is called the Vestibular Dynamic Inclinometer (VDI). The measurement of all the parameters is done using kinematic analysis, and thus is independent of the dynamics of the body. For all these reasons the cost of making the VDI is greatly reduced relative to the prior art IMUs. The Vestibular Dynamic Inclinometer (VDI) uses two strategically (symmetrically) placed multi-axis accelerometers and one single axis gyroscope to measure inclination parameters for robots undergoing planar motion (two degrees-of-freedom robots).

To analyze the equilibrium position of a robot, the concept of Dynamic Equilibrium Axis (DEA) is introduced. The DEA is the axis along which the robot is at equilibrium. The inclination angle is obtained relative to the Dynamic Equilibrium Axis (DEA). It is proposed that this is a better control parameter as the position of equilibrium is different from the absolute position (i.e. the vertical posture of humans or unstable equilibrium position of inverted pendulum under gravitational force).

Disclosed below are: an explanation of the kinematic analysis for a robot moving in a plane; the concept of the DEA; and a description of the VDI. Following this is a discussion including: an input-output model for the VDI on a body (e.g. a link); a parameter measurement algorithm; a description of the pVDI, which extends the VDI to a five degrees-of-freedom motion of a robots; application of the DEA concept to five-degrees-of-freedom robots; and a parameter measurement algorithm for links joined by universal joint.

Analogy from the Human Vestibular System

Figure 2:
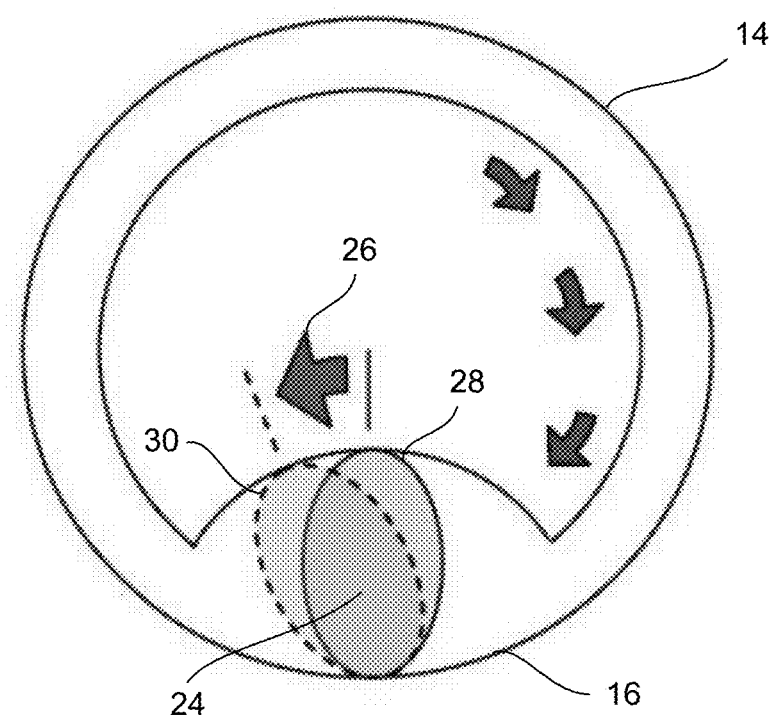
FIG. 2 is a schematic representation of a human ear semicircular canal.
Figure 3:
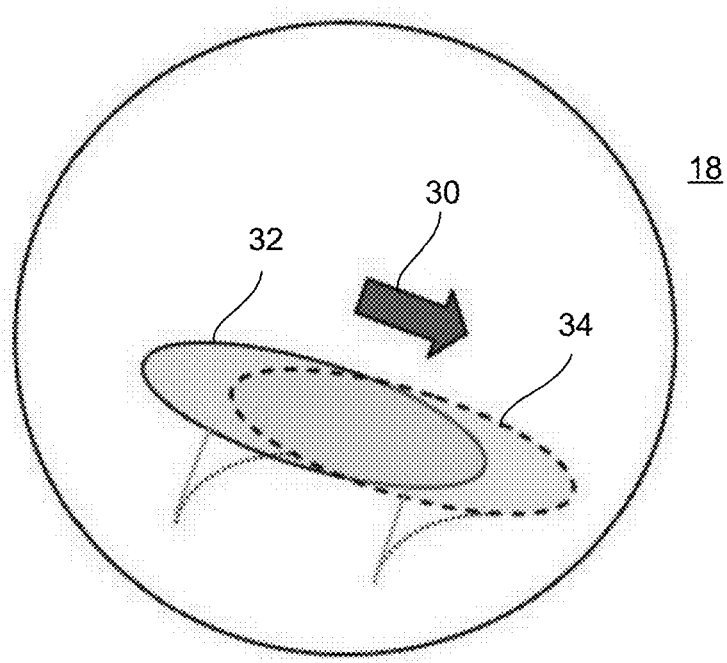
FIG. 3 is a schematic representation of a human ear otolith organ.

For measurement of the spatial orientation of the body, humans possess vestibular organs as seen in FIG. 1, which is the equivalent biological inertial measurement unit 10. They consist of two main receptor systems for inertial sensing—semicircular canals 12 having ducts 14 and ampullae 16, and Otolith organs 18, including the utricle 20 and the saccule 22. The semicircular canals 12 are filled with viscous fluid, endolymph, which moves when the human body experiences angular acceleration in low frequency rotation and angular velocity in the mid- to high-frequency range. As illustrated in FIG. 2, angular acceleration causes a viscous flow of endolymph through the ducts 14 and into the ampulla 16, causing a cupula 24 to deflect 26 from an equilibrium position 28 to a deflected position 30 register an accumulated angular velocity. Angular acceleration causes a viscous flow of endolymph through the semicircular canal and into the ampulla, deflecting the cupula to register accumulated angular velocity. This part is assumed to be analogous to a gyroscope (MEMS) sensor. As illustrated in FIG. 3, otolith organs 18 deflect 30 from an equilibrium position 32 to a deflected position 34 to register linear acceleration.

Figure 4:
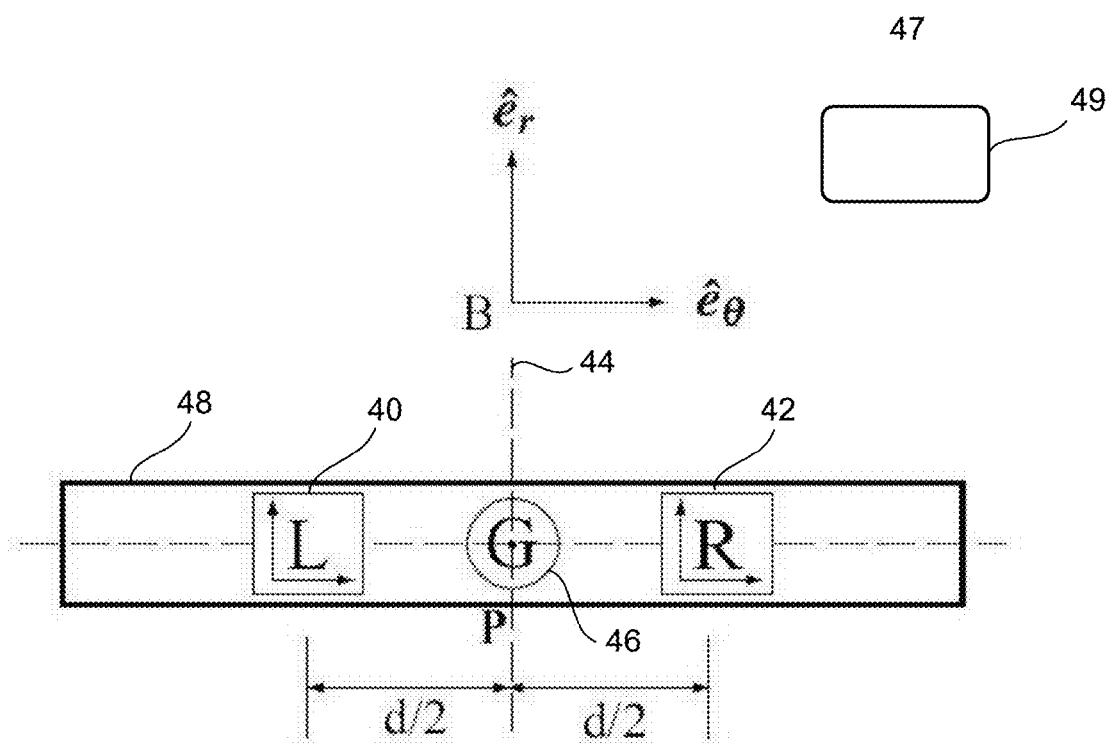
FIG. 4 is a schematic representation positioning of the VDI components within the VDI.

The utricle 20 is sensitive to a change in horizontal linear acceleration and the saccule 22 is sensitive to the vertical linear acceleration. Damped by fluid endolymph, otolith organs 18 deflect from the equilibrium position 28 to register linear acceleration. A dual-axis accelerometer (MEMS) is assumed to be analogous to the otolith organs 18. Here, each vestibular organ 12+18, (or alternately, 14,16, 20, and 22) is assumed to be analogous to a dual-axis accelerometer and a single-axis gyroscope (the VDI). Human ears are places placed symmetrically about the an axis of symmetry (along which the nose lies), thus in an exemplary embodiment the VDI sensor that has the vestibular-analogous accelerometer-gyroscope symmetrically placed about a symmetrical line. In another exemplary embodiment the gyroscope need not be symmetrically placed on the body to be measured. The gyroscope readings for both the gyroscopes will be theoretically the same (as they are attached to the same rigid body). However, the accelerometer readings for both accelerometers will be different. The design in FIG. 4 is proposed which has multi-axis, accelerometers, in particular it has two dual-axis accelerometers 40, 42 (L, R) symmetrically placed across a vertical line 44 and one gyroscope, in particular a single-axis gyroscope 46 (G). This sensor is called the Vestibular Dynamic Inclinometer 47 (VDI). The two dual-axis accelerometers 40, 42 and the gyroscope 46 may be secured to a substrate 48. The dual axis accelerometers 40, 42 may be connected to a processor 49 to carry out analysis of the measured data.

Figure 5:
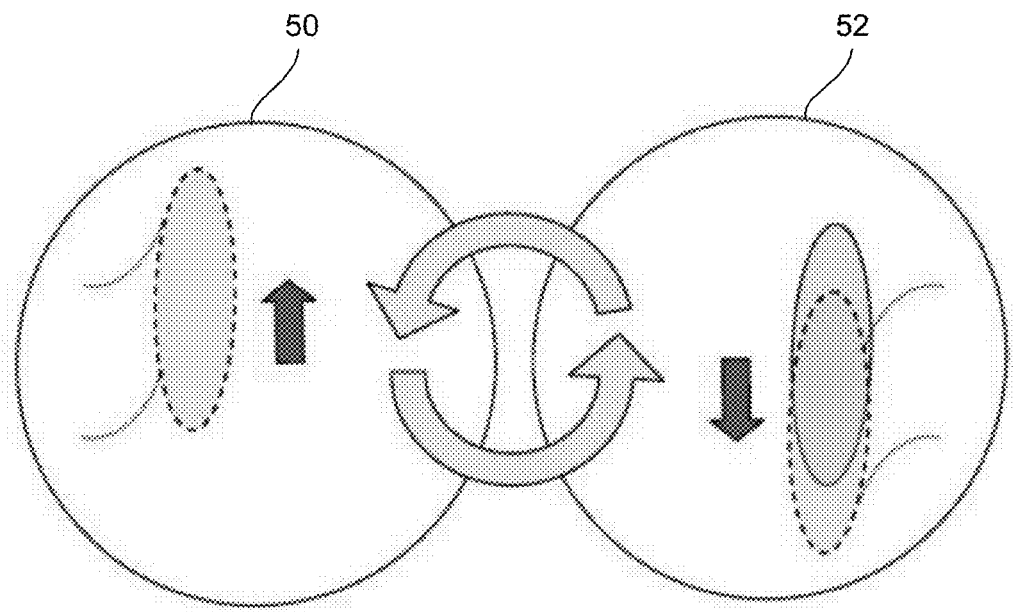
FIG. 5 is a schematic representation of human ear saccules.
Figure 6:
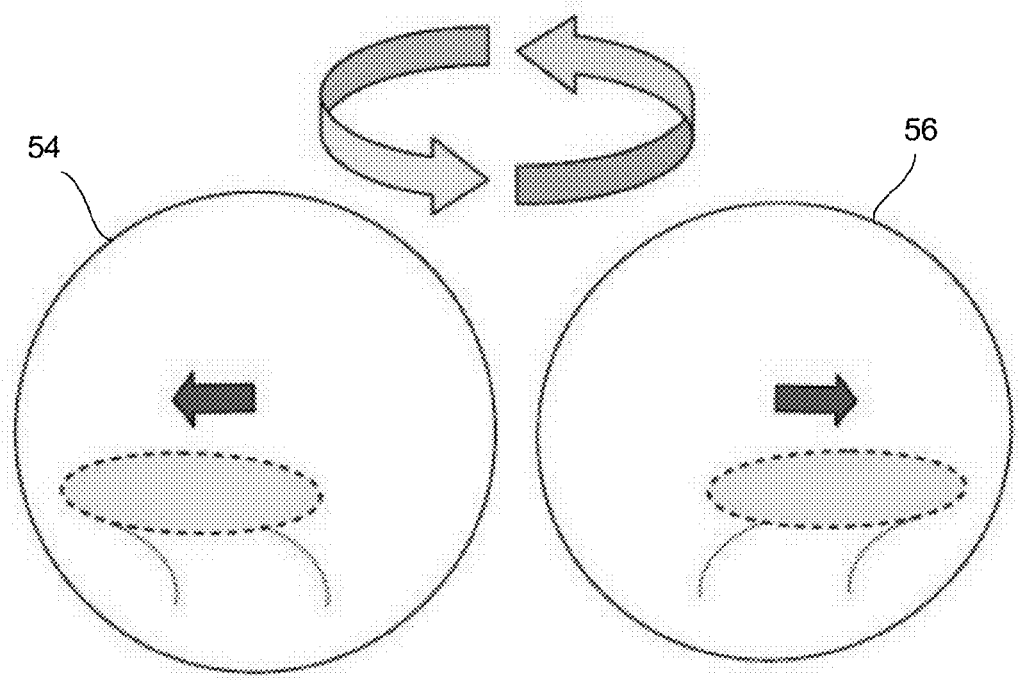
FIG. 6 is a schematic representation of human ear utricles.

The vestibular system is capable of sensing the angular acceleration from the difference of the linear acceleration readings of left vertical otolith 50 and right vertical otoliths 52, as can be seen in FIG. 5. The difference between left horizontal otolith 54 and right horizontal otoliths 56 can also sense the magnitude of the angular velocity but is not able to determine the direction, as can be seen in FIG. 6. As mentioned earlier, drawing from the efficient human vestibular system, the otolith organs 18 are interpreted as dual-axis accelerometers 40, 42 having two components—radial and tangential or vertical and horizontal. The next few sections confirm that the difference between horizontal (or radial) otoliths (accelerometer readings) yield angular acceleration. Also, the difference between vertical (or tangential) otoliths (accelerometer readings) yields magnitude, and not direction of angular velocity. The semicircular canal mechanics to calculate the angular velocity is interpreted as a gyroscope rather than an integration of angular acceleration to obtain angular velocity, mainly to avoid accumulation of error due to integration.

Explanation of the Kinematic Analysis for the Case of a Static Inclination

Figure 7:
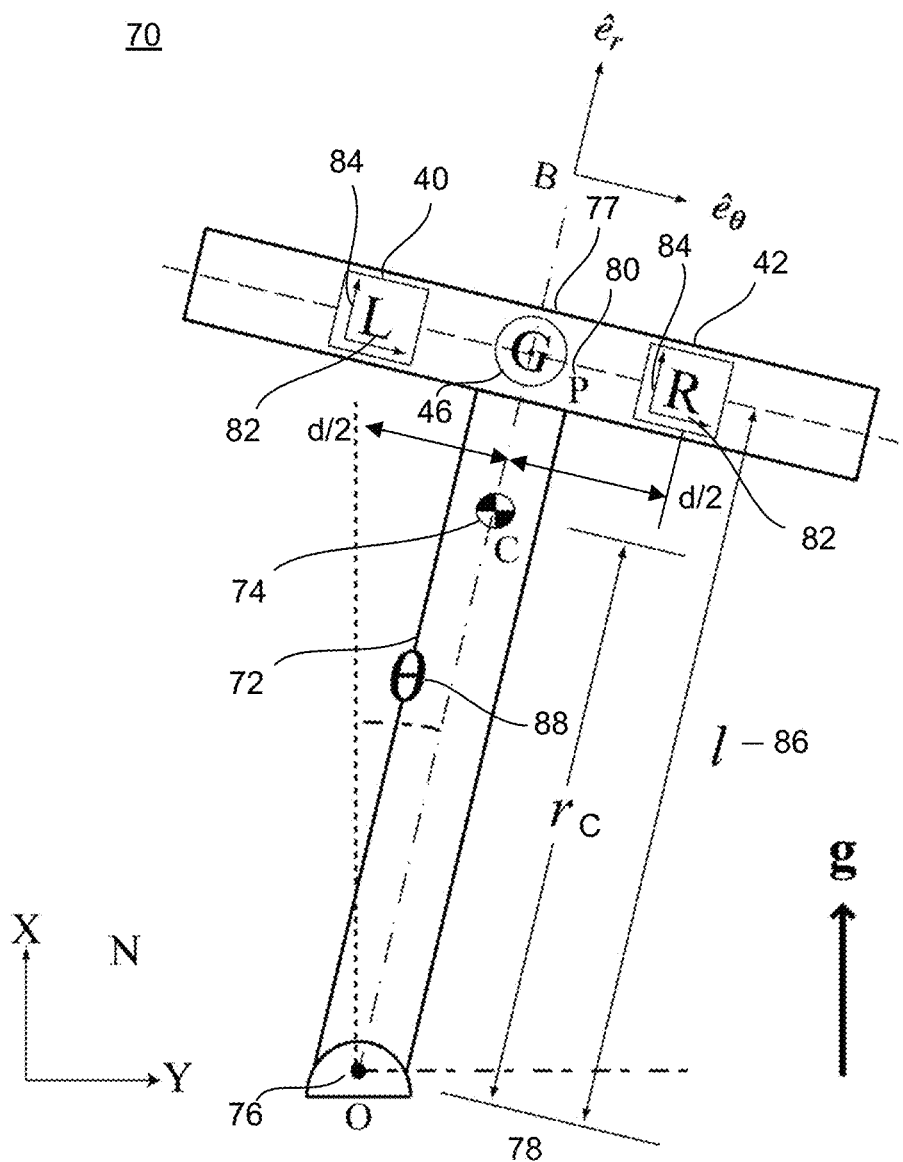
FIG. 7 is a schematic representation of a static body with the VDI attached.
Figure 8:
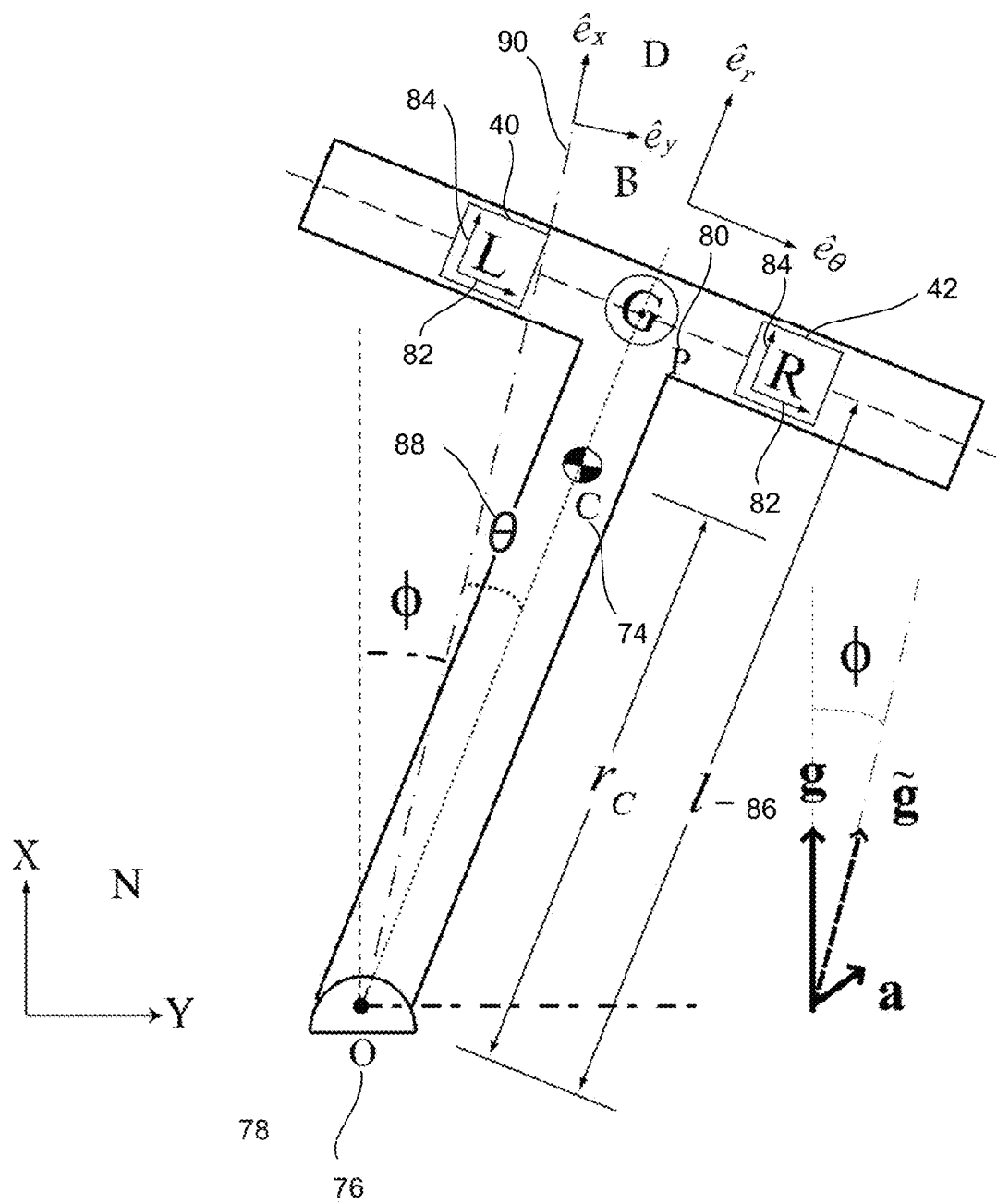
FIG. 8 is a schematic representation of a dynamic body with the VDI attached.

As seen in FIG. 7, A robot 70 is modeled as a rigid body rod 72 with mass m, center of mass C 74 along the rod rigid body 72 at a distance $r_C$ from the a base end 76 of the rigid body 72 opposite a distal end 77, moment of inertia $I_C^B$ at point C and angular damping coefficient $K_d$ (see FIGS. 7, 8). Point O, the base end 76 of the rigid body 72, is the point of contact between the a platform 78 (which may be inertial or non-inertial) and the rigid body 72. The rigid body 72 moves within the plane of the paper that includes the X axis and the Y axis, known as a first plane, in which the dual axis accelerometers 40, 42 reside.

Let N represent the inertial reference frame and B represent the reference frame fixed to the rigid body 72. The angular velocity between coordinate system N and B is denoted by $^N\omega^B$ which can be written as $$^N\omega^B = \dot\theta \hat e_z. \tag{1}$$

A coordinate system fixed in inertial reference frame with origin at O, Y-axis parallel to the ground, Z-axis into the plane of the paper, and fixed in reference frame N is defined with $\{\hat x, \hat y, \hat z\}$ as the orthonormal basis. Another coordinate system with origin O fixed in body reference frame B, $\{\hat e_r, \hat e_\theta, \hat e_z\}$ orthogonal basis vectors in radial, tangential directions, and into the plane of the paper respectively is defined. The acceleration sensed in L/R accelerometer is denoted by $^N a_{L/R}$. The placement of the dual axis accelerometers 40, 42 is symmetric about point P 80 (analogous to the human nose). Each dual axis accelerometer includes a first axis 82 and a second axis 84. The first axis 82 are within the first plane and are perpendicular to the line of symmetry, which may be the line indicated by points O, C, and P, the second axes 84 are within the first plane and are parallel to the line of symmetry Point P 80, also known as a first position, or position of association of the VDI, is at a distance $l$ 86 radially along the bodyrigid body 72, whereas, the accelerometers R, L 40, 42 are located at a distance d/2 on either side of point P 80 in a tangential direction to the rigid body 72. (It is possible to place the dual axis accelerometers 40, 42 at other locations and account for the lack of symmetry within the algorithms. However when placed using symmetry any necessary calibration may be quicker.) It is desired to obtain the inclination angle ($\theta$) 88, angular velocity ($\dot\theta$) and angular acceleration ($\ddot\theta$) from the designed sensors 40, 42, 80 for the following cases—inertial platform and non-inertial platform. In the case when the platform 78 is inertial or static, the acceleration experienced by point O 76 is only the gravitational acceleration as shown in FIG. 7.

The kinematic analysis to obtain the sensed accelerations in the accelerometers and at any point M on the bodyrigid body 72

$$r_M = r_O + r_{O \to M}$$

$$^N v_M = {}^N v_O + {}^N\omega^B \times r_{O \to M}$$

$$^N a_M = {}^N a_O + {}^N\alpha^B \times r_{O \to M} + {}^N\omega^B \times ({}^N\omega^B \times r_{O \to M}). \tag{2}$$

where M may be $\{L, R, C\}$ and it is known $$r_{O \to C} = r_C \hat e_r \tag{3}$$

$$r_{O \to L/R} = l\hat e_r \mp \frac{d}{2} \hat e_\theta$$

$$^N a_O = g = -g\cos\theta \hat e_r + g\sin\theta \hat e_\theta$$

where $^N a_O$ denotes the acceleration sensed by the accelerometer when it is placed at point O 76 i.e. the gravitational acceleration. Thus, yielding$_a$ $$^N a_C = g + r_C(\ddot\theta \hat e_\theta - \dot\theta^2 \hat e_r) \tag{4}$$

$$^N a_L = -\left(l\dot\theta^2 - \frac{d}{2}\ddot\theta - g\cos\theta\right)\hat e_r + \left(l\ddot\theta + \frac{d}{2}\dot\theta^2 - g\sin\theta\right)\hat e_\theta \tag{5}$$

$$^N a_R = -\left(l\dot\theta^2 + \frac{d}{2}\ddot\theta - g\cos\theta\right)\hat e_r + \left(l\ddot\theta - \frac{d}{2}\dot\theta^2 - g\sin\theta\right)\hat e_\theta \tag{6}$$

Uniquely, only a kinematic analysis of the body is performed, thus, it is important to observe that all the calculations are independent of the dynamics of the body rigid body 72 i.e. control torque, external force etc.

Four readings are obtained from the two dual axis accelerometers 40, 42 (radial and tangential components in Equations 5, 6). Calculating the difference and mean of the readings and calling them $\zeta_1$, $\zeta_2$ yields $$\zeta_1 = {}^N a_L - {}^N a_R \tag{7}$$

$$\zeta_2 = \frac{1}{2}({}^N a_L + {}^N a_R) \tag{8}$$

$$\zeta_1 = \underbrace{d\ddot\theta}_{\zeta_{1r}} \hat e_r + \underbrace{d\dot\theta^2}_{\zeta_{1\theta}} \hat e_\theta \tag{9}$$

$$\zeta_2 = \underbrace{(l\dot\theta^2 - g\cos\theta)}_{\zeta_{2r}} \hat e_r + \underbrace{(l\ddot\theta - g\sin\theta)}_{\zeta_{2\theta}} \hat e_\theta \tag{10}$$

Thus, the angular acceleration, velocity and inclination angle 88 can be obtained as $$\ddot\theta = \frac{\zeta_{1r}}{d} \tag{11}$$

$$\sin\theta = \frac{\frac{l}{d}\zeta_{1r} - \zeta_{2\theta}}{g} \tag{12}$$

$$\cos\theta = \frac{\frac{l}{d}\zeta_{1\theta} + \zeta_{2r}}{g} \tag{13}$$

$$\tan\theta = \frac{\frac{l}{d}\zeta_{1r} - \zeta_{2\theta}}{\frac{l}{d}\zeta_{1\theta} + \zeta_{2r}} \tag{14}$$

$$g = \frac{\frac{l}{d}\zeta_{1r} - \zeta_{2\theta}}{\sin\theta} = \frac{\frac{l}{d}\zeta_{1\theta} + \zeta_{2r}}{\cos\theta} \tag{15}$$

It is important to observe that $\tan\theta$ (Equation 14) is independent of gravitational acceleration g and the inclination angle $\theta$ 88 can be uniquely determined (assuming g>0). It is also. It is also possible to determine the gravitational acceleration g from Equation 15. Obtaining the angular velocity ($\dot\theta$) is a little tricky, as the sensor mathematics is able to obtain the magnitude of the angular acceleration, but not the direction. Angular velocity can be obtained by integration of angular acceleration (Equation 16), directly from accelerometers (Equation 17) or from the gyroscope readings (Equation 1).

$$\theta_I = \int \dot{\theta} dt \quad (16)$$

$$\dot{\theta}_{otolith} = \text{sign}\left(\int \ddot{\theta} dt\right)\sqrt{\left|\frac{\zeta_{1\theta}}{d}\right|} \quad (17)$$

Calculation of angular velocity from Equation 16 is prone to accumulation of error (drift) when the body is in state of equilibrium and Equation 17 will result in magnification of contribution of noise as a square root is involved. For all these reasons, the reading from the gyroscope, Equation 1, is used to calculate the angular velocity. Stated another way, this method takes the mean and difference of the accelerometer readings and uses them with the gyroscope readings to get inclination parameters.

Explanation of the Kinematic Analysis for a Robot Moving in a Plane and the Dynamic Equilibrium Axis (DEA)

In the case when the platform 78 is non-inertial or moving, the acceleration experienced by point O 76 is the sum of gravitational acceleration, g, and acceleration of the platform, a, as shown in FIG. 8. Let $\tilde{g}$ be defined as follows $$\tilde{g} = g + a. \quad (18)$$

Let $\phi$ be the angle between g and $\tilde{g}$ measured in a clockwise sense. The Dynamic Equilibrium Coordinate system is defined to be fixed in the inertial reference frame N with origin at point O 76. The vectors $\{\hat{e}_x, \hat{e}_y, \hat{e}_z\}$ form a set of orthonormal basis vectors such that $\hat{e}_x$ is parallel to vector $\tilde{g}$ and $\hat{e}_z$ is into the plane of the paper.

The kinematic analysis is performed, and the acceleration of point O 76 changes to $${}^N a_O = \tilde{g} \hat{e}_x = -\tilde{g} \cos\theta \hat{e}_r + \tilde{g} \sin\theta \hat{e}_\theta \quad (19)$$

Also, assuming constant 'a', $${}^N a_C = \tilde{g} + r_C(\ddot{\theta}\hat{e}_\theta - \dot{\theta}^2 \hat{e}_r) \quad (20)$$

$${}^N a_L = -\left(l\dot{\theta}^2 - \frac{d}{2}\ddot{\theta} - \tilde{g}\cos\theta\right)\hat{e}_r + \left(l\ddot{\theta} + \frac{d}{2}\dot{\theta}^2 - \tilde{g}\sin\theta\right)\hat{e}_\theta \quad (21)$$

$${}^N a_R = -\left(l\dot{\theta}^2 + \frac{d}{2}\ddot{\theta} - \tilde{g}\cos\theta\right)\hat{e}_r + \left(l\ddot{\theta} - \frac{d}{2}\dot{\theta}^2 - \tilde{g}\sin\theta\right)\hat{e}_\theta \quad (22)$$

Let the reaction forces at point O 76 be denoted by $F_R$. Applying Euler's first and second law at the center of mass C 74 of the body gives $$|m(\tilde{g} + r_C(\ddot{\theta}\hat{e}_\theta - \dot{\theta}^2\hat{e}_r)) = F_R \quad (23)$$

$$I_C^B \cdot {}^N \alpha^C = -K_d \dot{\theta} \hat{e}_z + (-r_C \hat{e}_r) \times F_R \quad (24)$$

Thus, $$(I_C^B + mr_C^2)\ddot{\theta} = -K_d \dot{\theta} + m\tilde{g} r_C \sin\theta \quad (25)$$

From Equation 25, the equilibrium position ($\ddot{\theta}^* = \dot{\theta}^* = 0$) of the system is $\theta^* = 0$. The aim of the problem is to bring the rigid body 72 to its equilibrium position which is no longer the absolute vertical position (i.e. direction parallel to gravity vector g). The new equilibrium position is defined as the Dynamic Equilibrium Axis (DEA) which is parallel to the resulting acceleration on the body $\tilde{g}$, inclined at angle $\phi$ to g. The Dynamic Equilibrium Axis (DEA) 90 is dependent on the resultant acceleration of point O 76 and thus is time-varying (more precisely, acceleration varying). When the rigid body 72 is accelerating, $\phi$ is positive, when its decelerating, $\phi$ is negative. This fact can be observed when humans lean forward when trying to accelerate (sprint) and bend backwards while attempting to de-accelerate. Both the cases display how the equilibrium axis (DEA) 90 changes with acceleration being experienced by the rigid body 72. As humans are able to balance while experiencing varying acceleration, it reinforces the efficiency of the sensor design. Quantities $\zeta_1, \zeta_2$ are defined as in Equations 7, 8. $\zeta_{1r}, \zeta_{2r}$ and $\zeta_{1\theta}, \zeta_{2\theta}$ represent their radial and tangential components. Angular velocity is obtained from Equation 1 i.e. directly from the gyroscope. Other inclination parameters are obtained in the following manner $$\ddot{\theta} = \frac{\zeta_{1r}}{d} \quad (26)$$

$$\sin\theta = \frac{\frac{l}{d}\zeta_{1r} - \zeta_{2\theta}}{\tilde{g}} \quad (27)$$

$$\cos\theta = \frac{\frac{l}{d}\zeta_{1\theta} + \zeta_{2r}}{\tilde{g}} \quad (28)$$

$$\tan\theta = \frac{\frac{l}{d}\zeta_{1r} - \zeta_{2\theta}}{\frac{l}{d}\zeta_{1\theta} + \zeta_{2r}} \quad (29)$$

$$\tilde{g} = \frac{\frac{l}{d}\zeta_{1r} - \zeta_{2\theta}}{\sin\theta} = \frac{\frac{l}{d}\zeta_{1\theta} + \zeta_{2r}}{\cos\theta} \quad (30)$$

It can again be observed that the inclination angle, Equation 29, is independent of the net acceleration ($\tilde{g}$) of point O 76 and can be uniquely determined (assuming $\tilde{g} > 0$). It is also possible to determine the magnitude of the resultant acceleration ($\tilde{g}$) of surface of contact (i.e. point O 76). The inclination angle thus obtained is the inclination angle from the "equilibrium position" or the DEA 90, not the absolute vertical. This is foreseen as a better control parameter for future robot postural balance and control. Stated another way the use of multiple inertial sensors (linear accelerometers) permits the VDI to compensate for non-gravitational acceleration measured by linear accelerometers.

Simulations

Figure 9:
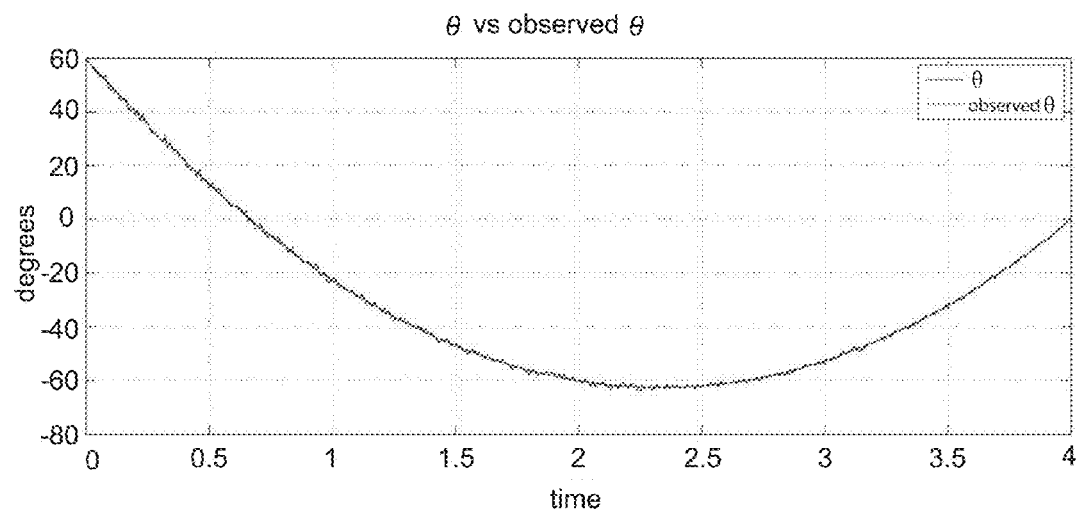
FIG. 9 is a chart representing true inclination angle vs. observed inclination angle.
Figure 10:
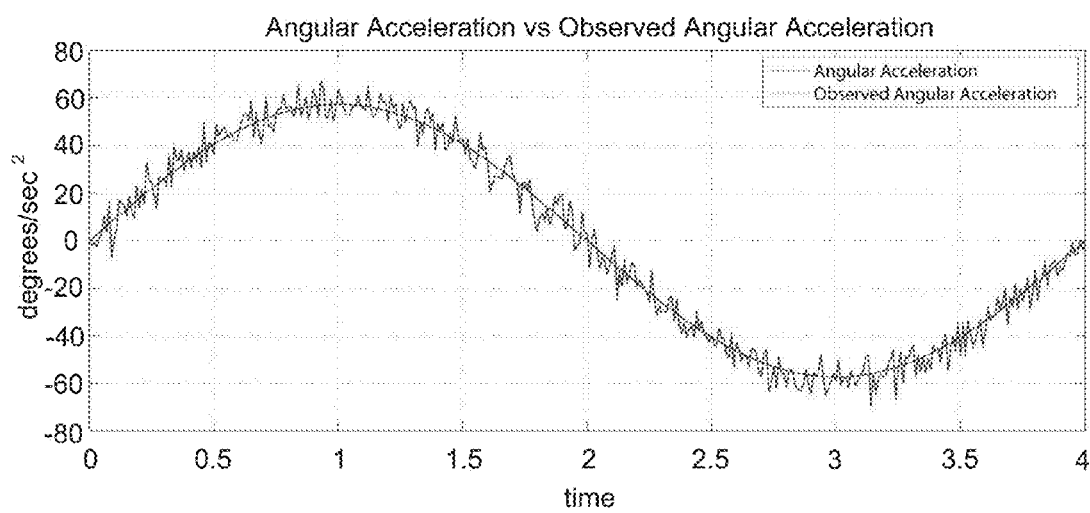
FIG. 10 is a chart representing true angular acceleration vs. observed angular acceleration.
Figure 11:
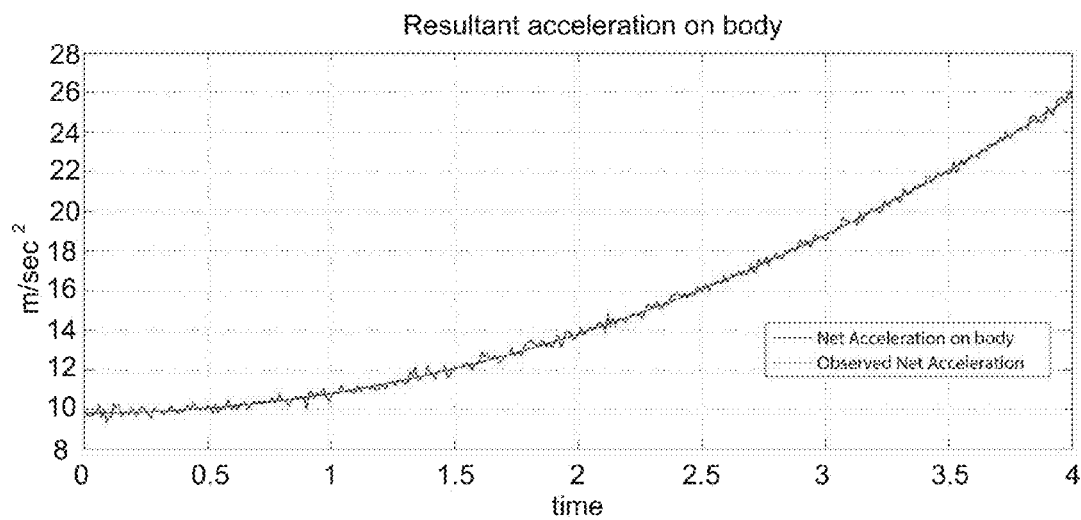
FIG. 11 is a chart representing true net acceleration experienced by a body vs. observed net acceleration experienced by a body.
Figure 12:
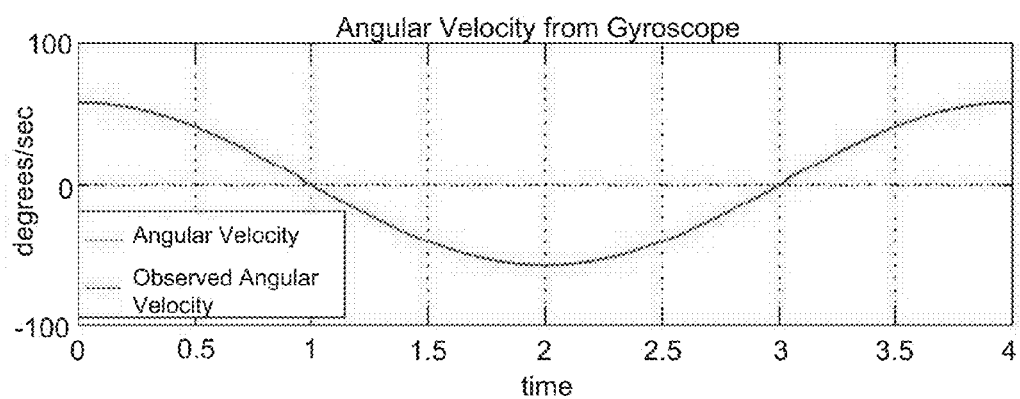
FIG. 12 compares in chart form angular velocity from a gyroscope and angular velocity from accelerometers.
Figure 12:
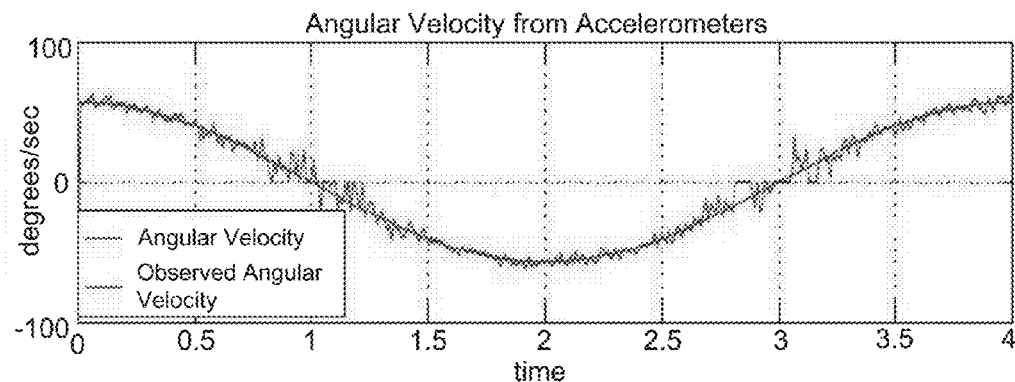
Figure 13:
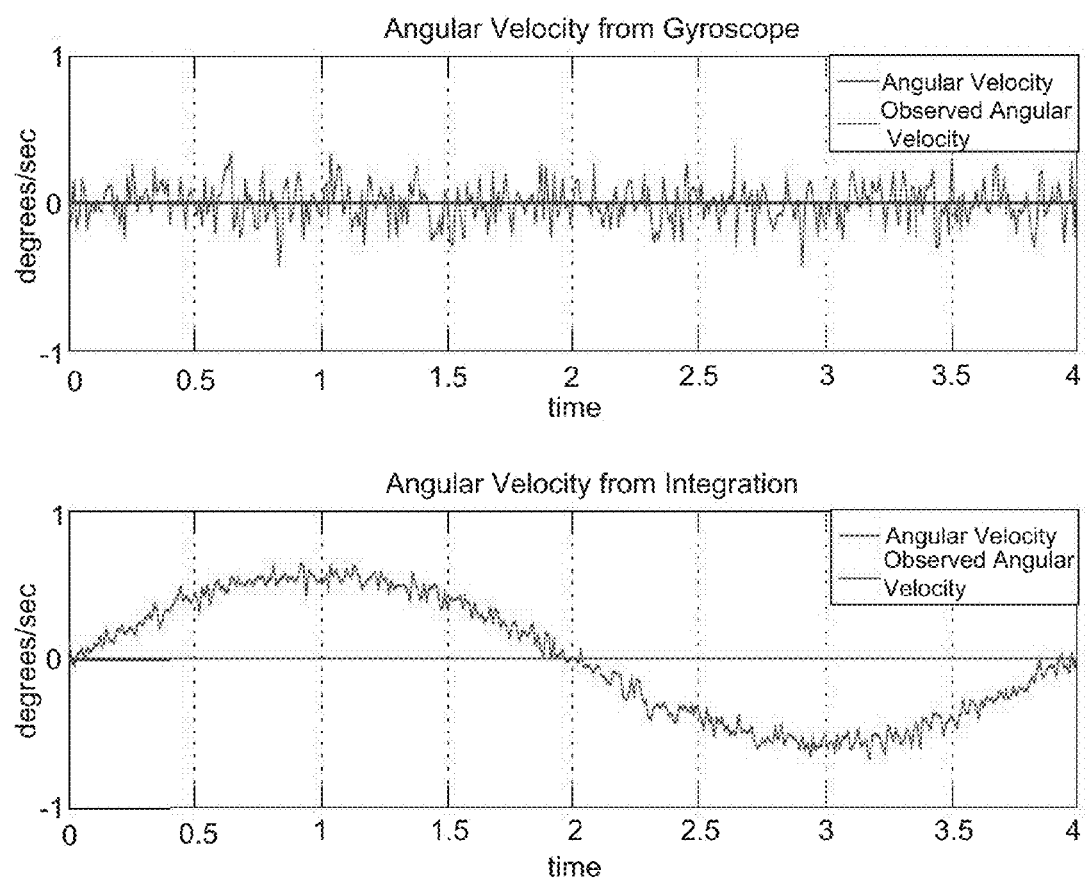
FIG. 13 compares in chart form angular velocity from a gyroscope and angular velocity calculated using integration.

Simulations of the above were performed using MATLAB software. The parameters for simulations are taken to be analogous to the human body with I=2 m, d=0.25 m. The sensor noise was modeled as stationary white noise which is constant throughout the frequency spectrum based on the specification data sheet of accelerometer ADXL213 (noise density of 160 µg/√Hz rms) and gyroscope ADXRS450 (noise density of 0.015°/sec/√Hz). FIG. 9 shows good estimation of inclination angle θ purely from kinematic calculations and without use of system dynamics (Kalman Filter). The error in measurement seems acceptable/small as the surface of contact (foot for humans) compensates for it while balancing. The angular acceleration and magnitude of net acceleration acting on the body are also well estimated as shown in FIGS. 10 and 11. FIGS. 12 and 13 prove why calculation of angular velocity from equations 16, 17 is erroneous. FIG. 12 compares the angular velocity estimated using Equation 17 to that from gyroscope. FIG. 13 shows the concept of error accumulation (drift) due to integration when angular velocity is calculated using Equation 16.

An Input-output Model for the VDI on a Body (e.g. a Link)

The VDI can also be used to estimate inclination parameters of an assembly of bodies, for example, a base link and a second link joined at a joint. A desired application may include legs of a biped robot.

The following nomenclature is used within this section

Figure 14:
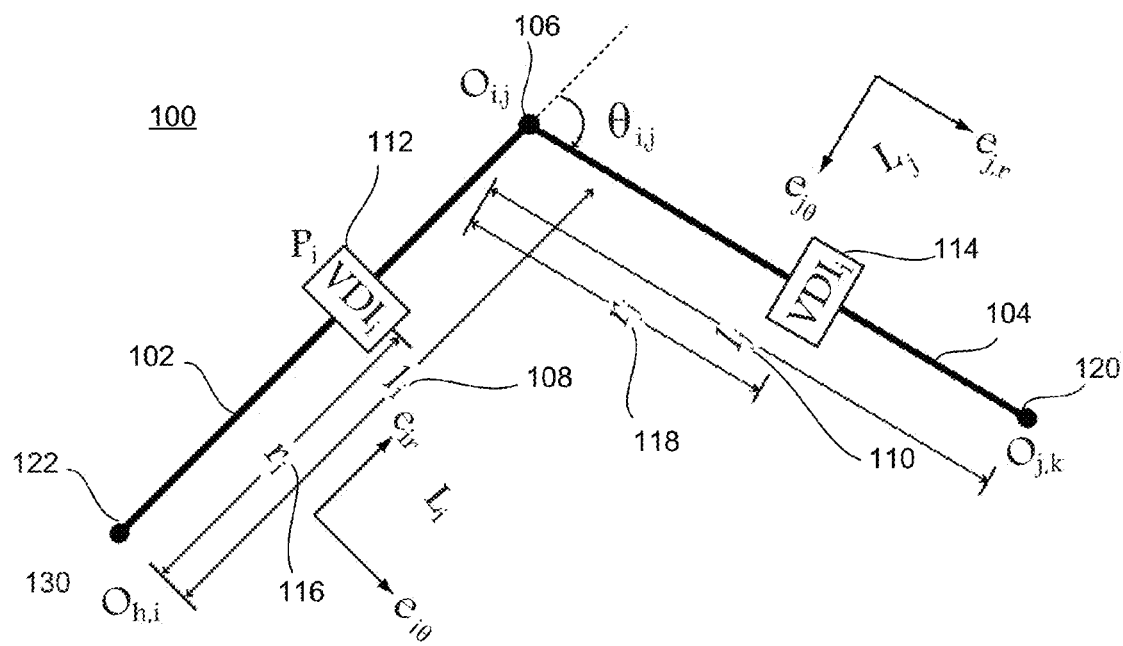
FIG. 14 is a schematic representation of two links joined with a revolute joint.

DEA Dynamic Equilibrium Axis $^{N}a^{i}_{Q}$ Acceleration of point Q in inertial reference frame and represented in link r coordinate system $O_{i,j}$ Revolute joint between link i and link j $\theta_{i,j}$ Joint-angle between link i and link j $\gamma_{k}$ Angle between the vertical (the DEA) and the link k $VDI_{i}$ The VDI sensor placed on link i $^{N}\omega^{j}$ Angular velocity of link j in w.r.t. inertial reference frame $^{N}\alpha^{j}$ Angular acceleration of link j in w.r.t. inertial reference frame A mechanism 100 including a series of linkages 102, 104 joined by revolute joint 106 is given as shown in FIG. 14. The linkages 102, 104 are modeled as rigid bodies with known respective link lengths 108, 110 and respective Vestibular Dynamic Inclinometers (VDI) 112, 114 are located on each linkage 102, 104 at some convenient respective distance 116, 118 along the line joining the two link joints 106, 120 or the point of contact 122 and a joint 106 in case of the base link 102. The base link 102 is defined as a link that has a joint 106 at one end of the link 102 and the other end is in contact with the base 130 (or ground, which is assumed to be stationary) surface. Let $O_{i,j}$ represent the joint 106 joining link i 102 to link j 104. The line joining joints $O_{h,i}$($O_{b}$ for base link) and $O_{i,j}$ ($O_{b,j}$ for the base link) is referred to as the link vector of the link. Let the VDI 112 be located at a distance $r_{i}$ along the link vector of link i 102. The joint angle $\theta_{i,j}$ between links i 102 and j 104 is defined as the angle of rotation between the respective link coordinate systems. The link length of link 1 is given by $l_{i}$, coordinate systems.

Figure 17:
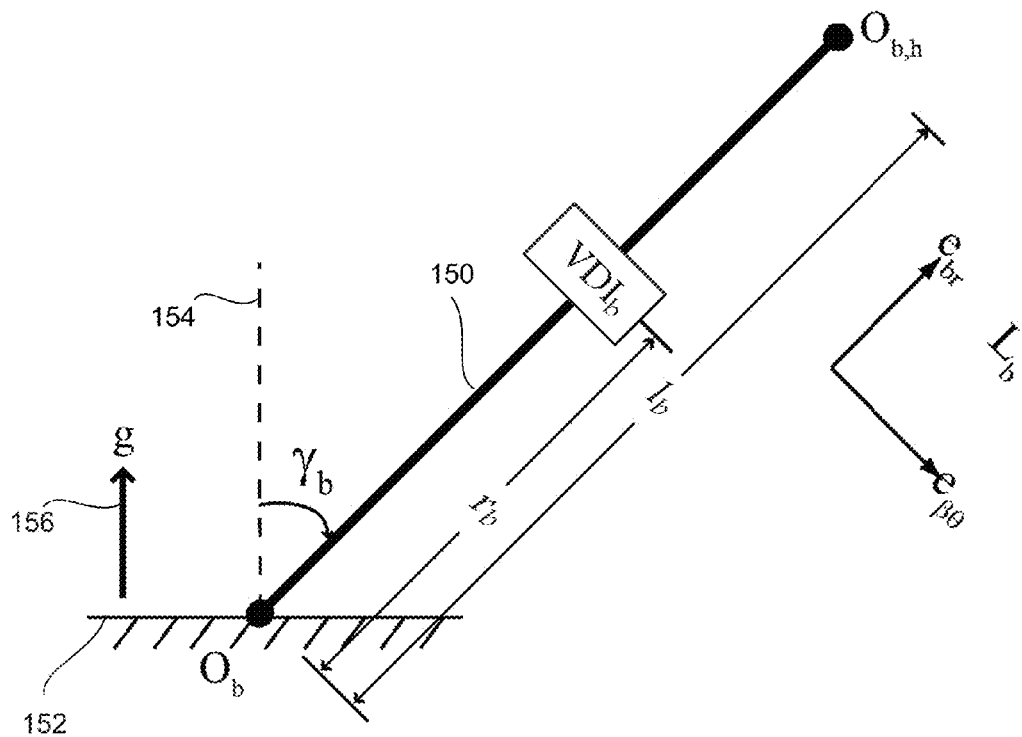
FIG. 17 is a schematic representation of a base link capable of planar motion in contact with a ground surface.

Let N represent the inertial reference frame and $L_{i}$ represent the reference frame fixed on the link i. The link i coordinate system with origin at point $O_{p,i}$ is fixed in the link i reference frame $L_{i}$, with $\hat{e}_{i}=\{e_{ir},e_{i\theta},e_{iz}\}$ orthogonal basis vectors such that $e_{ir}$ is along the link vector of link i and $e_{iz}$ is into the plane of paper as shown in FIG. 14. The joint angle $\theta_{i,j}$ is the angle between $e_{ir}$ and $e_{jr}$. For the case of the base link, the origin of the coordinate system lies at the point of contact $O_{b}$ and the angle between the vertical (direction of gravitational acceleration) and the link is referred to as the base angle ($\gamma_{b}$) as shown in FIG. 17.

It is desired to obtain the base angle ($\gamma_{b}$), joint angles ($\theta_{i,j}$s), angular velocities ($^{N}\omega^{i}$s) and the angular accelerations ($^{N}\alpha^{i}$s) of the links with given link lengths ($l_{i}$s) and location of the VDI sensors ($r_{i}$s).

Figure 15:
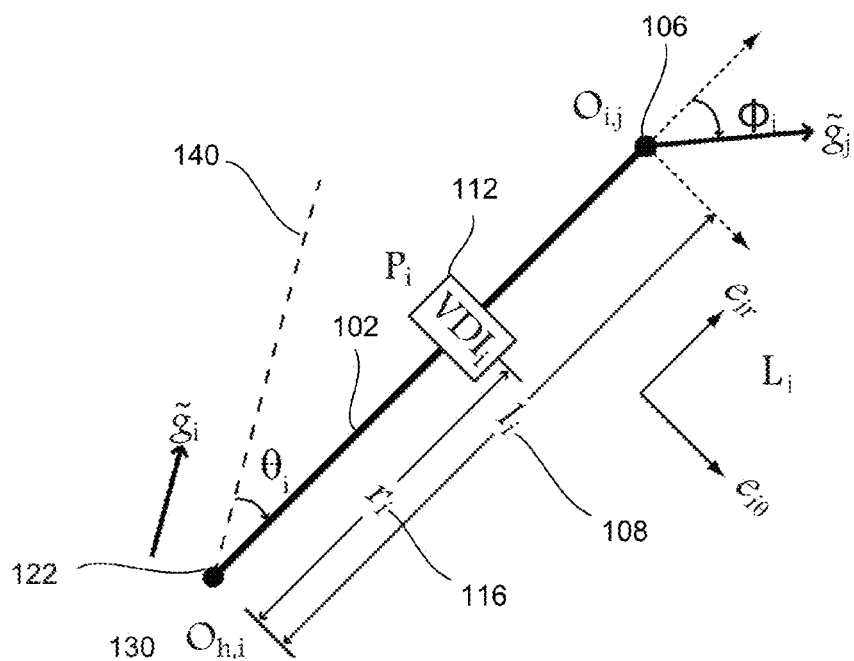
FIG. 15 is a schematic representation of a link joined via revolute joints at each end with two other links.

For the case of a link i 102 joined to links h and j 104 as shown in FIG. 15, the inclination parameters estimated by the VDI 112 will be the inclination angle from the DEA 140 of $\theta_{i}$, angular velocity $\dot{\theta}_{i}$, angular acceleration $\ddot{\theta}_{i}$ and magnitude of acceleration $\tilde{g}_{i}$ acting at the point of (virtual) contact $O_{h,i}$ 130 given the location of the VDI 112, $r_{i}$ as follows:

$$\zeta_{1,i} = (^{F}a_{L,i} - {^{F}a_{R,i}}) \quad (31)$$

$$\zeta_{2,i} = \frac{1}{2}(^{F}a_{L,i} + {^{F}a_{R,i}}) \quad (32)$$

$$\theta = \frac{(\zeta_{1,i})_{r}}{d} \quad (33)$$

$$\theta = atan2\left(\frac{r_{i}}{d}(\zeta_{1,i})_{r} - (\zeta_{2,i})_{\theta}, \frac{r_{i}}{d}(\zeta_{1,i})_{\theta} + (\zeta_{2,i})_{r}\right) \quad (34)$$

$$\tilde{g}_{i} = \frac{\frac{r_{i}}{d}(\zeta_{1,i})_{r} - (\zeta_{2,i})_{\theta}}{\sin\theta} = \frac{\frac{r_{i}}{d}(\zeta_{1,i})_{\theta} + (\zeta_{2,i})_{r}}{\cos\theta} \quad (35)$$

For a point Q on link i 102 given the displacement vector from point $O_{h,i}$ to point Q as $r_{Oh,i \to Q}$, the acceleration of point Q can be written as $$^{N}a_{Q} = {^{N}a_{O_{h,i}}} + {^{N}\alpha^{i}} \times r_{O_{h,i} \to Q} + {^{N}\omega^{i}} \times (^{N}\omega^{i} \times r_{O_{k,i} \to Q}) \quad (36)$$

The resultant acceleration of point $O_{i,j}$ can be determined in the following manner $$^{N}a_{O_{i,j}} = {^{N}a_{P_{i}}} + (l_{i}-r_{i})(^{N}\alpha^{i} \times e_{ir} + {^{N}\omega^{i}} \times (^{N}\omega^{i} \times e_{ir})) \quad (37)$$

The acceleration of point Pi in the Li coordinate system, $^{N}a^{i}_{P_{i}}$, is the mean of the left and right accelerometer readings of the VDI 112 and is an observable quantity. The acceleration of point $O_{i,j}$ in the $L_{i}$ coordinate system can be written as $$^{N}a^{i}_{O_{i,j}} = {^{N}a^{i}_{P_{i}}} + (l_{i}-r_{i})\begin{bmatrix}-\dot{\theta}_{i}^{2}\\ \ddot{\theta}_{i}\end{bmatrix}_{\{\hat{e}_{jr},\hat{e}_{j\theta}\}} = \tilde{g}_{j}. \quad (38)$$

Let $\phi_{i}$ be the angle of the resultant acceleration at point with $O_{i,j}$ with $e_{ir}$. It is worthwhile to indicate that the resultant acceleration of point $O_{i,j}$ will be parallel to the DEA 140 for the next link j. For this reason, $^{N}\alpha_{O_{i,j}}$ is referred to as $\tilde{g}_{i}$ in FIG. 15. The angle $\phi_{i}$ can be uniquely determined as $$\phi_{i} = atan2\left((^{N}a^{i}_{O_{i,j}})_{\theta}, (^{N}a^{i}_{O_{i,j}})_{r}\right) \quad (39)$$

Figure 16:
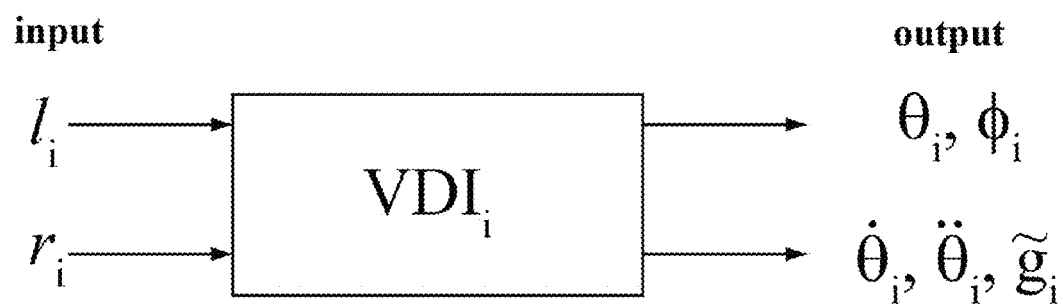
FIG. 16 is an input/output diagram describing the VDI function.

The parameters outputs of the $VDI_{i}$ are illustrated in FIG. 15 and the outputs of the $VDI_{i}$ are summarized in FIG. 16.

Parameter Measurement

Base Link Parameters: Given the base link b 150 as in FIG. 17, the parameters to be estimated are obtained from the $VDI_{b}$ (FIG. 16). As shown in the figure, the "ground" surface 152 is assumed to be at rest (only gravitational acceleration). In this case, the DEA 154 coincides with the vertical i.e. direction 156 of gravitational acceleration(g). The inclination parameters (base angle, angular velocity of the link, and angular acceleration) are obtained in the following manner $$\gamma_{b} = \theta_{b} \quad (40)$$

$$^{N}\omega^{b} = \dot{\theta}_{b} \quad (41)$$

$$^{N}\alpha^{b} = \ddot{\theta}_{b} \quad (42)$$

Figure 18:
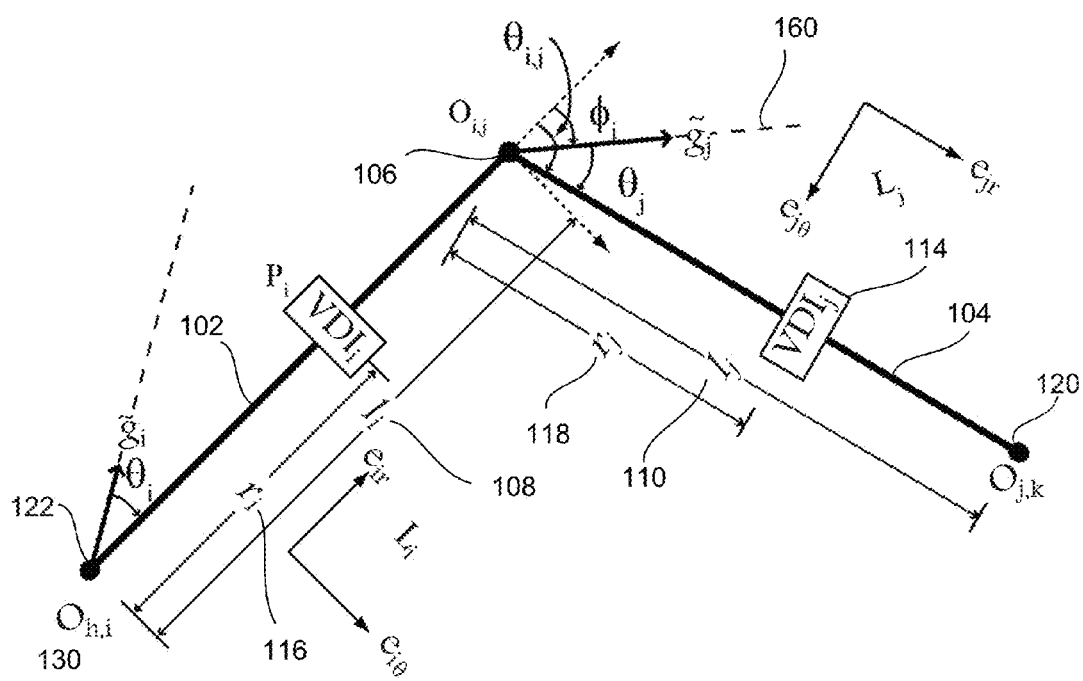
FIG. 18 is a schematic representation of two links joined at a revolute joint, each with a VDI on each link.

Inter-link Parameters: For two links i, j joined at point $O_{i,j}$ as shown in FIG. 18, it is desired to find the inclination parameters. The DEA 160 for link j is parallel to the resultant acceleration at point $O_{i,j}(\tilde{g}_{j})$. The angle between $e_{ir}$ and $\tilde{g}_{j}$ is given by $\phi_i$. The value of $\phi_i$ is determined from $VDI_i$ and $\theta_j$ is obtained from $VDI_j$ (FIG. 16). So, the joint angle is estimated as follows $$\theta_{i,j} = \phi_i + \theta_j \quad (43)$$

The other inclination parameters are estimated as follows $$^N\omega^i = \dot{\theta}_i, \, ^N\omega^j = \dot{\theta}_j \quad (44)$$

$$^N\alpha^i = \ddot{\theta}_i, \, ^N\alpha^j = \ddot{\theta}_j \quad (45)$$

Simulation that Incorporates Noise in the Sensors.

Figure 19:
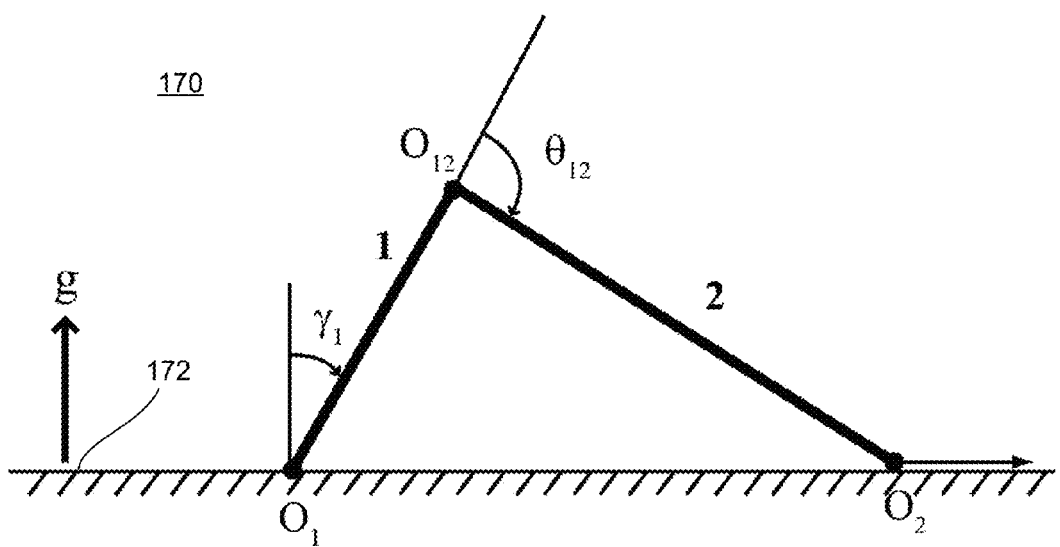
FIG. 19 is a schematic representation of a slider crank mechanism.
Figure 20:
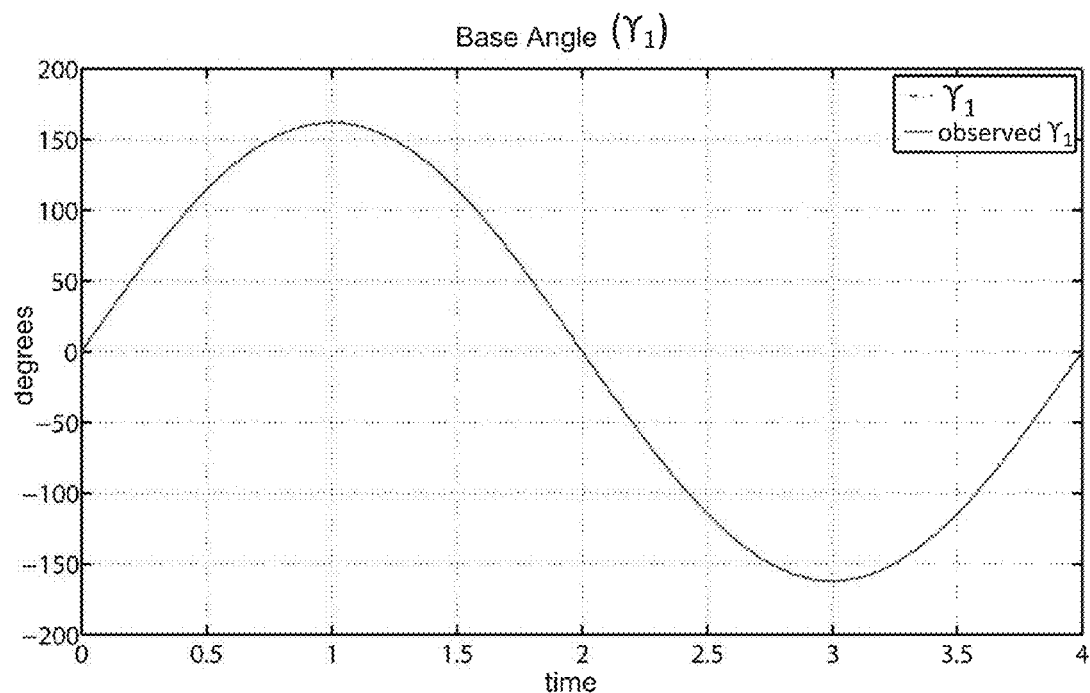
FIG. 20 is a chart of true base angle vs. observed base angle.
Figure 21:
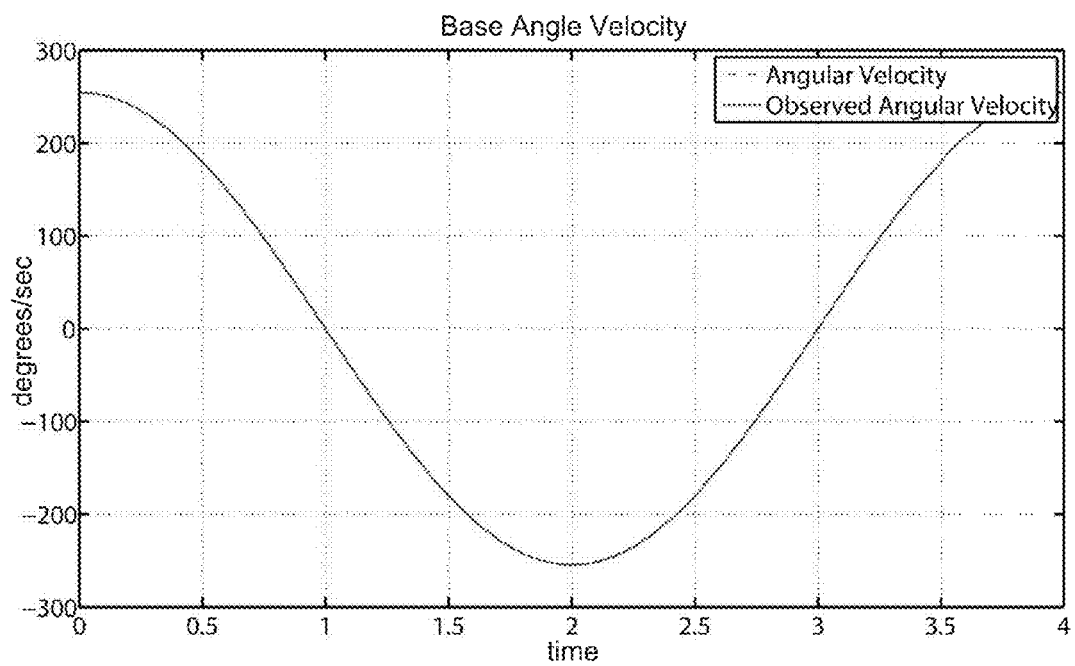
FIG. 21 is a chart of true angular velocity vs. observed angular velocity.
Figure 22:
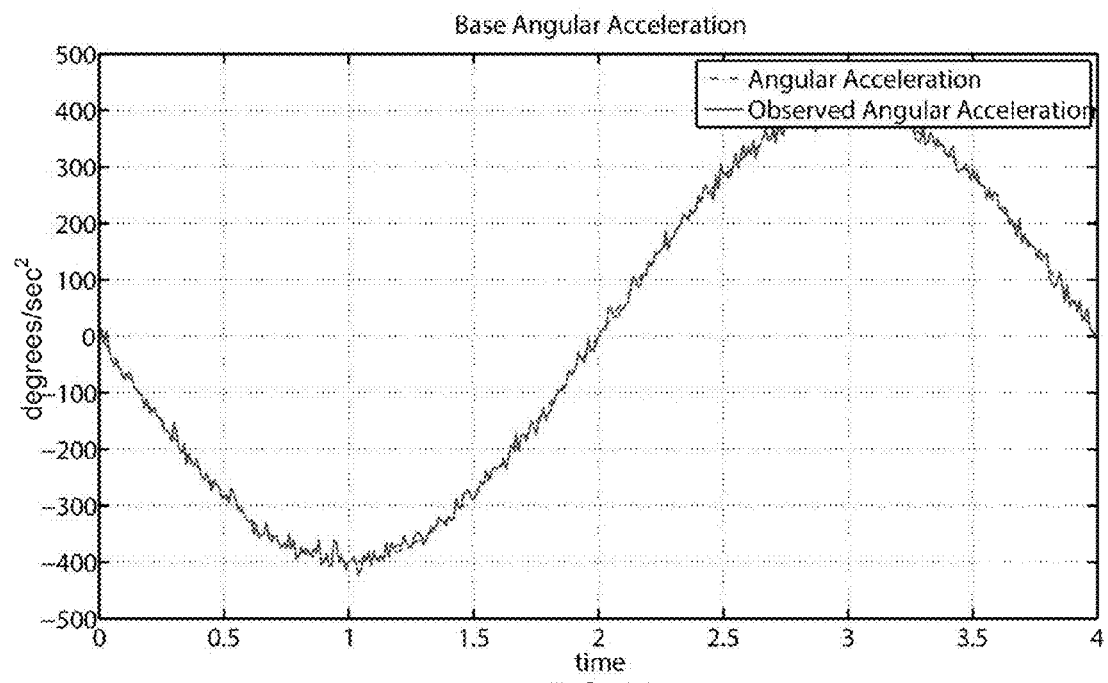
FIG. 22 is a chart of true base angular acceleration vs. observed base angular acceleration.
Figure 23:
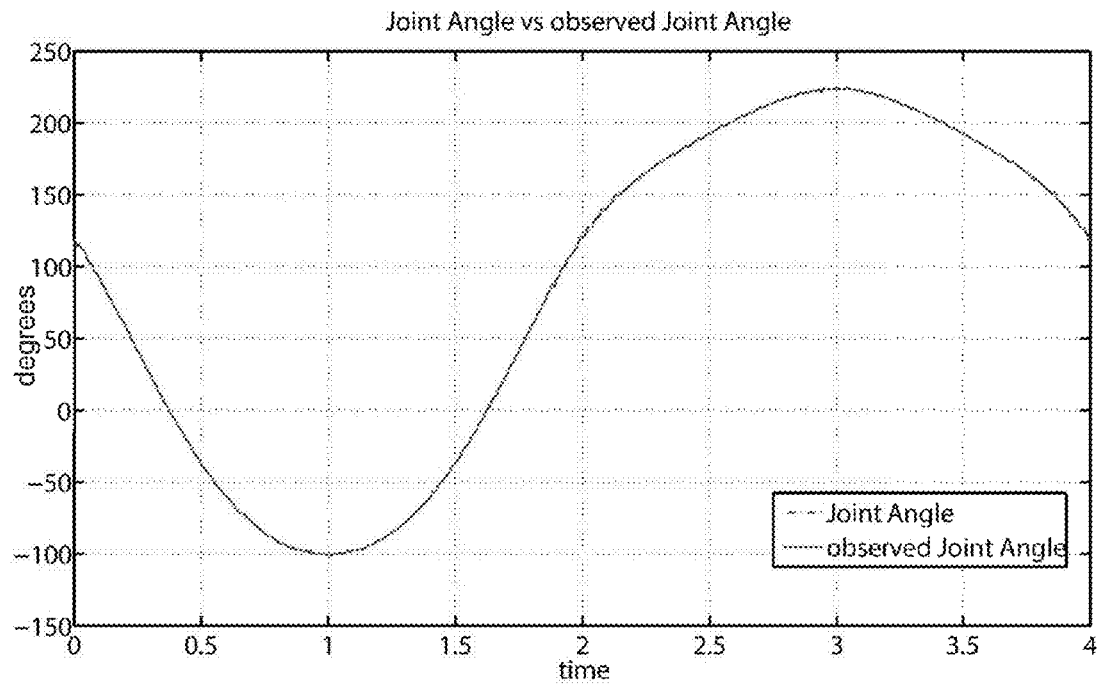
FIG. 23 is a chart of true joint angle vs. observed joint angle.
Figure 24:
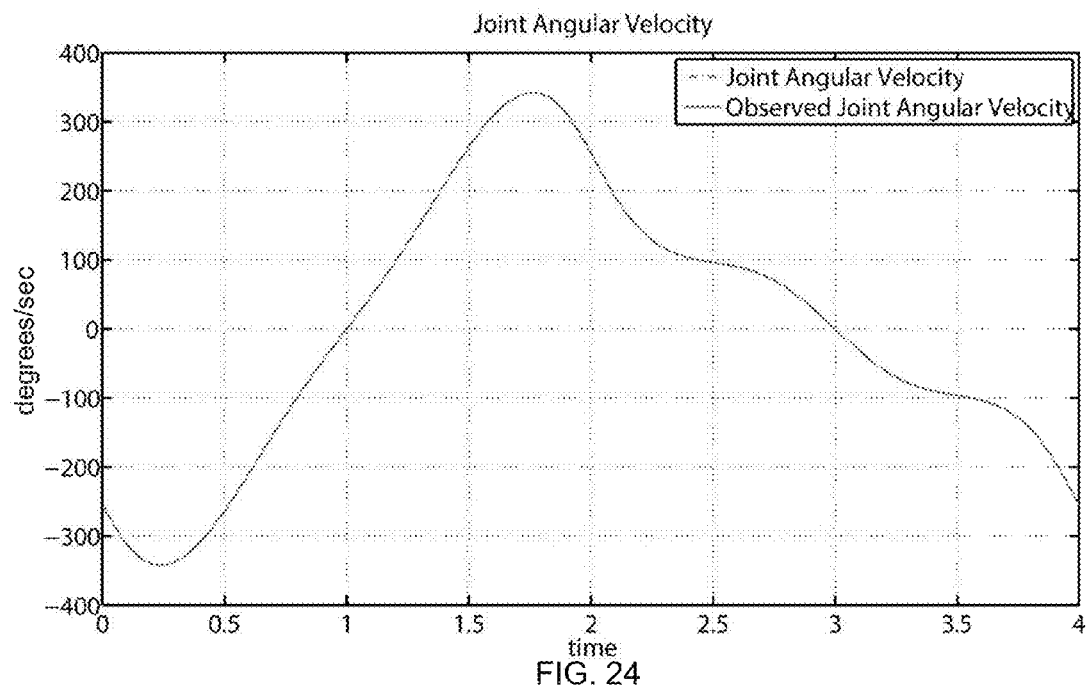
FIG. 24 is a chart of true joint angular velocity vs. observed joint angular velocity.
Figure 25:
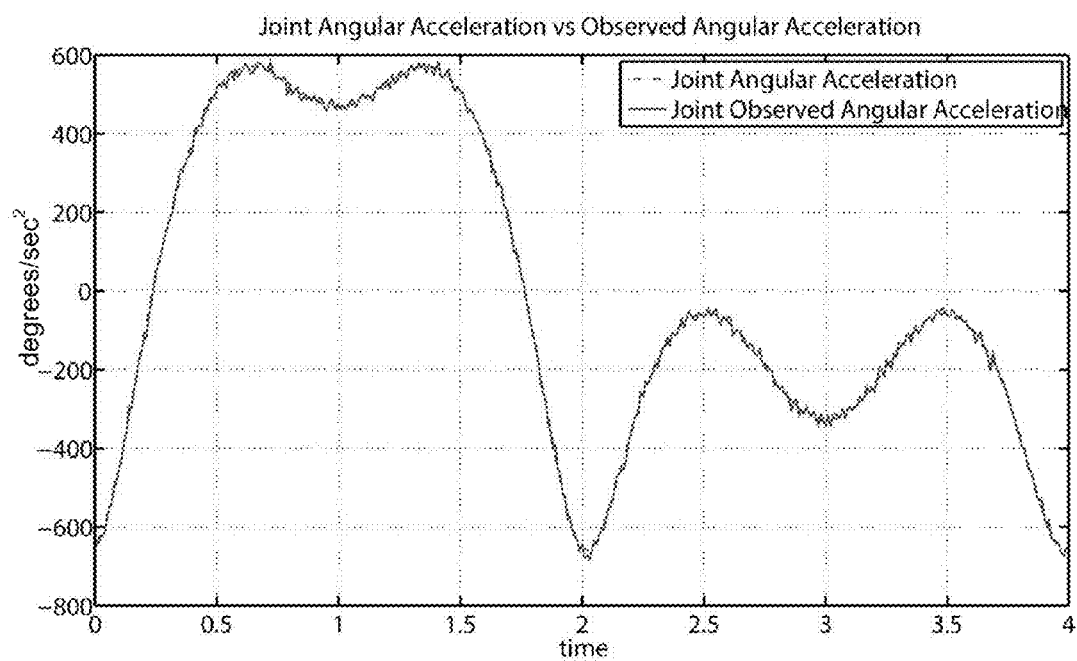
FIG. 25 is a chart of true joint angular acceleration vs. observed joint angular acceleration.
Figure 26:
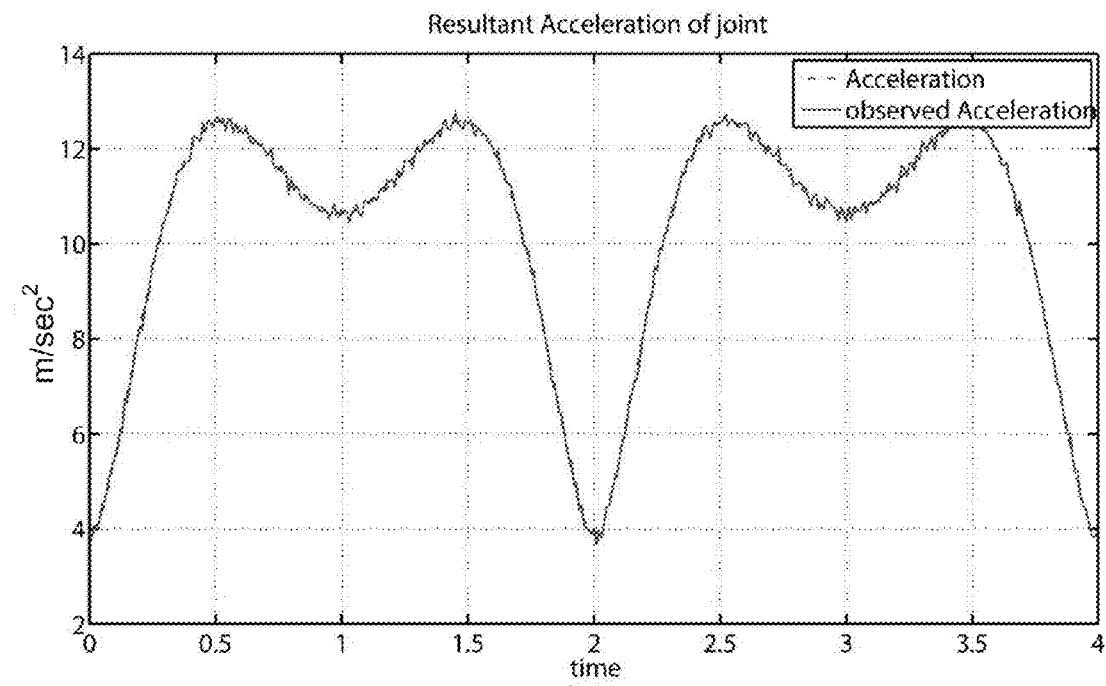
FIG. 26 is a chart of true joint acceleration vs. estimated joint acceleration.
Figure 27:
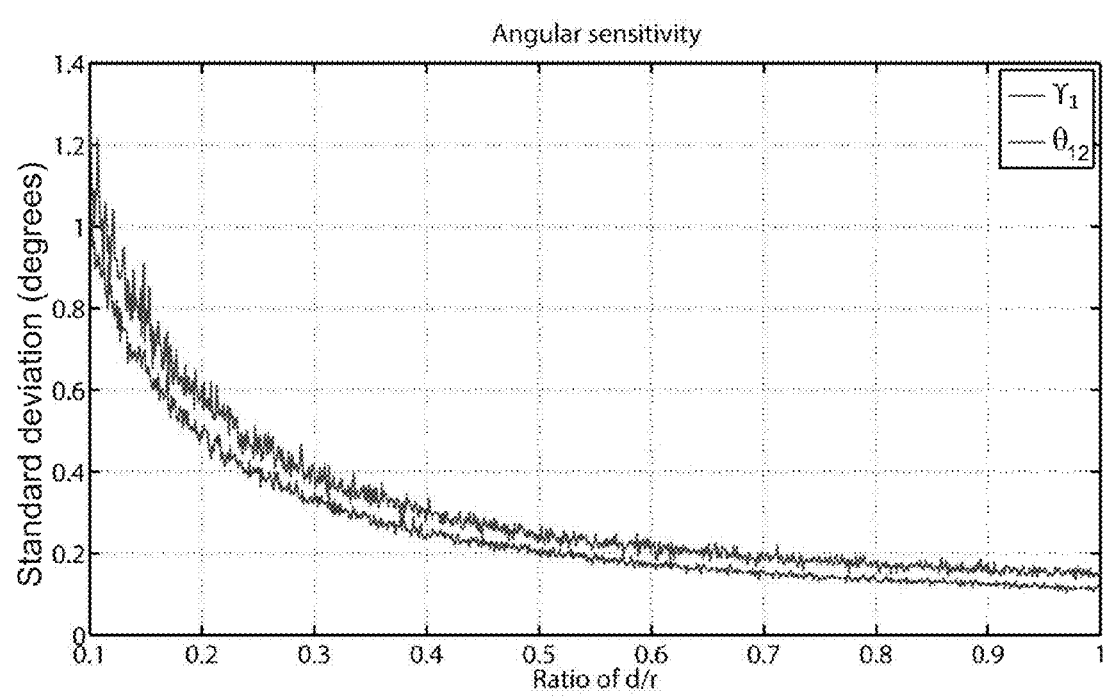
FIG. 27 is a chart of variation of standard deviation of inclination measured with change in d/r ratio.
Figure 28:
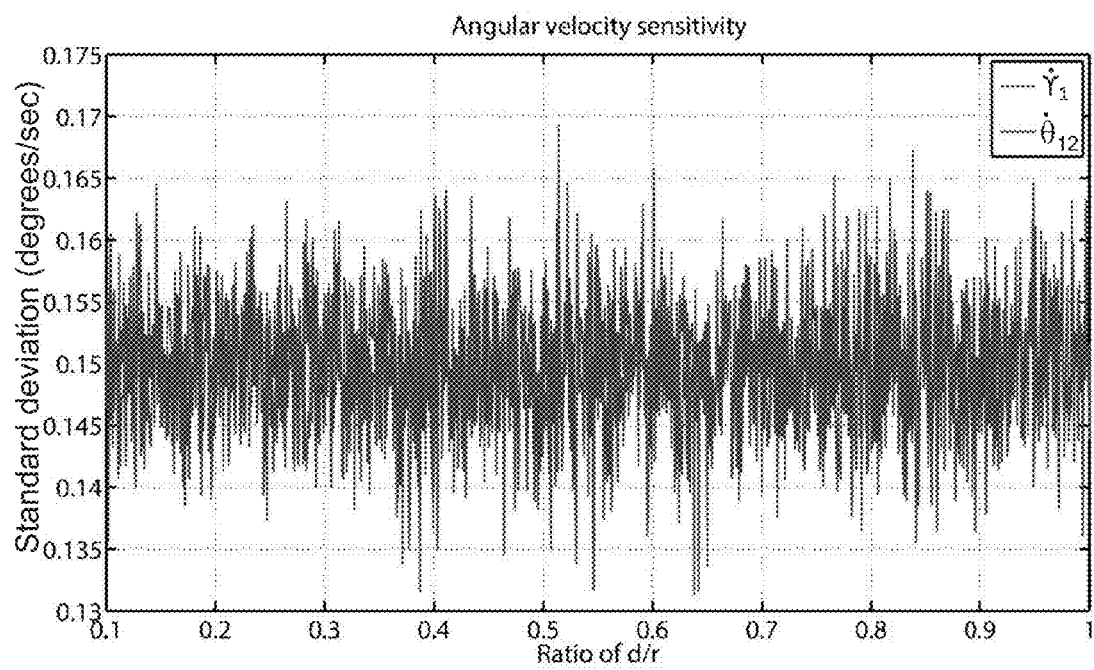
FIG. 28 is a chart of variation of standard deviation of angular velocity with change in d/r ratio.
Figure 29:
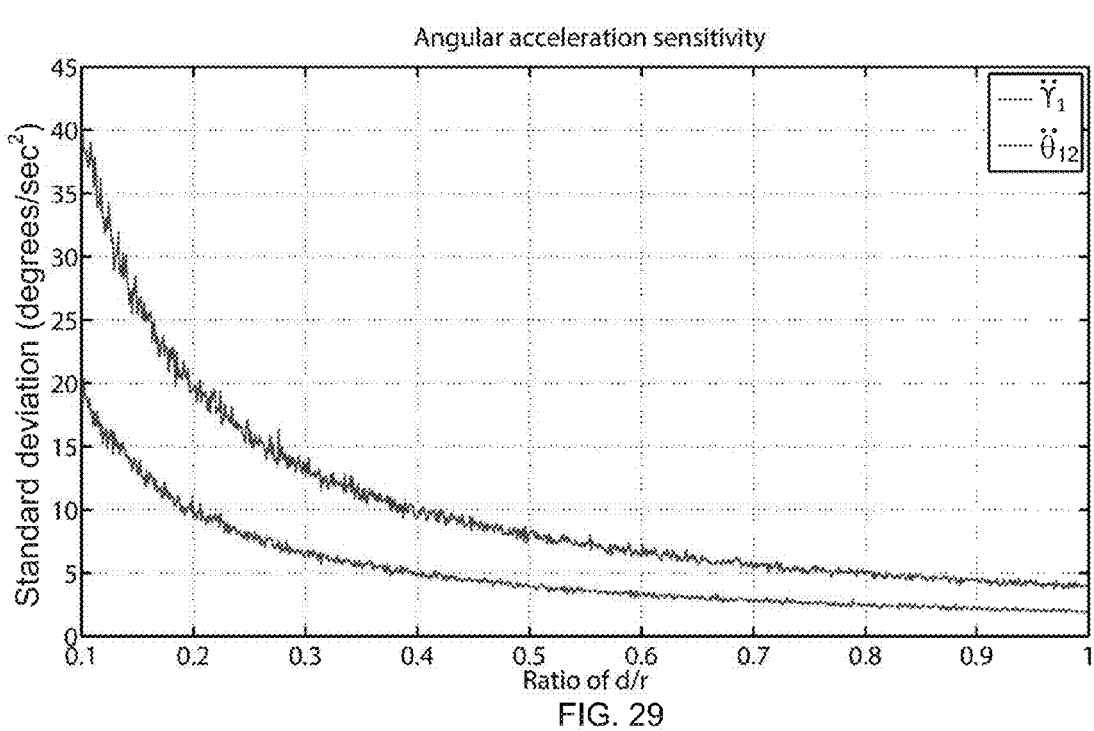
FIG. 29 is a chart of variation of standard deviation of angular acceleration with change in d/r ratio.
Figure 30:
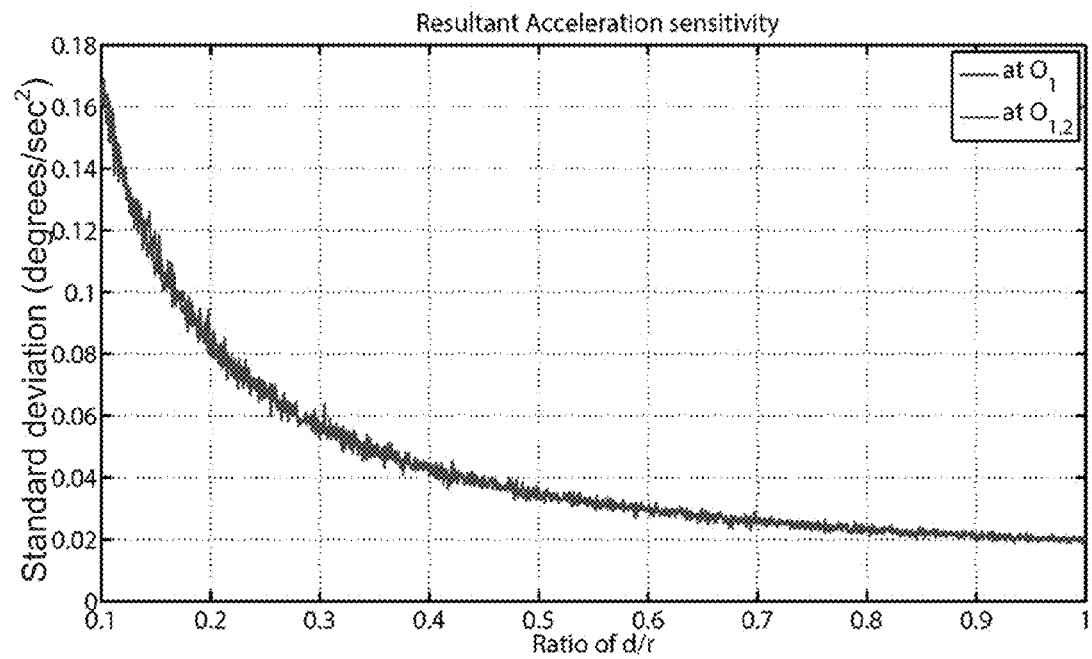
FIG. 30 is a chart of variation of standard deviation of resultant acceleration with change in d/r ratio.

A slider crank mechanism 170, shown in FIG. 19 with link lengths $l_1$=0.3 m, $l_2$=0.6 m and sensor locations of $r_1$=0.25 m, $r_2$=0.5 m, is simulated in MATLAB®. The sensor noise was modeled as stationary white noise which is constant throughout the frequency spectrum based on the specification data sheet of accelerometer ADXL213 (noise density of 160 μg/√Hz rms) and gyroscope ADXRS450 (noise density of 0.015°/sec/√Hz) manufactured by Analog Devices. The frequency of operation of the sensors is assumed to be 10 Hz. The location of the linear accelerometers in the VDI was assumed to be 10 cm apart. The platform 172 is assumed to be stationary. The simulation results are very encouraging and shown in FIGS. 20 through 26. The estimates for $\gamma_1, \theta_{12}, ^N\omega_1, \dot{\theta}_{12}, ^N\alpha_1, \ddot{\theta}_{12}, g$ and the resultant acceleration of the joint have standard deviations of 0.31 deg, 0.10 deg, 0.15 deg/sec, 0.15 deg/sec, 11.89 deg/sec2, 11.5 deg/sec2, 0.05 m/sec2 and 0.11 m/sec2 respectively. The propagation of error is not observed in simulations and the estimates do not 'drift' over time.

It is observed that the ratio of the distance between the linear accelerometers in the VDI (d) and the location of the VDI (r) affect the standard deviation errors for inclination parameters (base angle, joint angle, etc.). For the present simulation, the plots of the variation of standard deviation of angle, angular velocity, angular acceleration and resultant acceleration measured are shown in FIGS. 27 through 30. As it can be observed, a change in d/r ratio has an effect on inclination (angular), angular acceleration and resultant acceleration measurement error (standard deviation). The ideal d/r ratio may be 1 (which may not be practically possible), but a ratio of 0.4 above may give a satisfactory measurement error for common practical applications.

Figure 31:
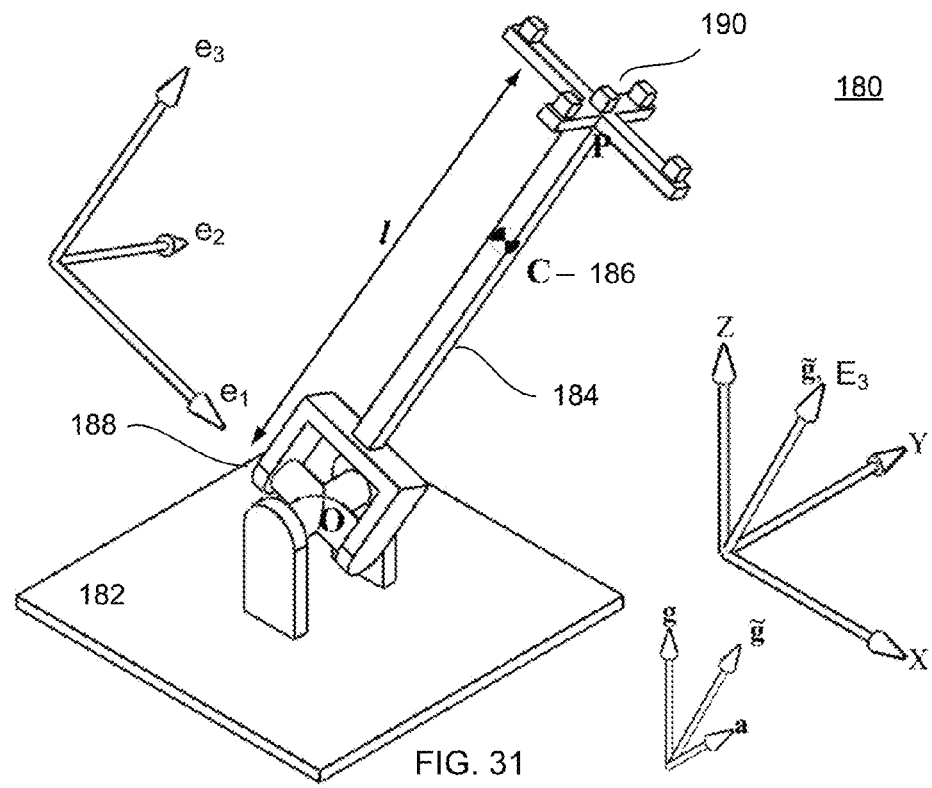
FIG. 31 is a schematic representation of a body possessing five degrees of freedom.

The Planar Vestibular Dynamic Inclinometer (pVDI) and Dynamic Equilibrium Axis for Five Degrees-of-freedom Robots A robot 180 is modeled as an inverted pendulum as shown in FIG. 31. The robot 180 possesses five degrees-of-freedom (planar motion of the base and two degrees-of-freedom serial chain). It is desired to sense the inclination angle, angular velocity, angular acceleration, and magnitude of acceleration of the platform 182 a.k.a. the surface of contact. The rigid body is modeled as a rod 184 with mass m, center of mass C 186 along the rod 184 at a distance $r_C$ from a base end 188 of the rod 184, moment of inertia $I_C^B$ at point C 186 and angular damping coefficient $K_d$. Let point O be at the base end 188 of the rigid body 184 in contact with a base platform 182 which is constrained to move on a surface (or a plane). The rigid body 184 may translate on a surface and is free to rotate. The planar Vestibular Dynamic Inclinometer uses four strategically (symmetrically) placed multi-axis accelerometers and one tri-axis gyroscope to measure inclination parameters for spatial motion (five-degrees-of-freedom robots) as show in FIG. 34. The tri-axis gyroscope may or may not be placed symmetrically on the rigid body 184. It may also be mentioned that the pVDI sensor is located on a link (e.g. as shown in FIG. 31). The rigid body 184 aligns with $e_3$ in FIG. 34 and is called the axis of symmetry. The axis $e_1$, $e_2$ and $e_3$ form an orthogonal basis. Two linear accelerometers 202, 204 lie symmetrically about $e_3$ along $e_1$ and the other two 206, 208 lie symmetrically about $e_3$ along $e_2$.

Let N represent the inertial reference frame and B represent the reference frame fixed on the rigid body 184. Let g be the gravitational acceleration on the body 184, a be the acceleration of point O with respect to the earth (inertial) reference frame and $\tilde{g}$ be the resultant of the previous two mentioned accelerations i.e. the acceleration of the platform of contact. Thus, $$\tilde{g} = g + a. \quad (18)$$

A coordinate system fixed in the inertial reference frame with origin at O, Z-axis orthogonal to surface of motion, and fixed in reference frame N is defined with {X, Y, Z} as the orthonormal basis. The Body coordinate system is defined as being fixed in the body reference frame B, origin at O and orthogonal basis vectors $e = \{\hat{e}_1, \hat{e}_2, \hat{e}_3\}$ with $\hat{e}_3$ along the vector joining point O to point C. The Dynamic Equilibrium coordinate system is defined to be fixed in the inertial reference frame N with origin at point O. The vectors $E = \{\hat{E}_1, \hat{E}_2, \hat{E}_3\}$ form a set of orthonormal basis vectors such that $\hat{E}_3$ is parallel to vector $\tilde{g}$. Point P is a point on the body at a distance l from point O as shown in FIG. 31.

Figures 32, 33:
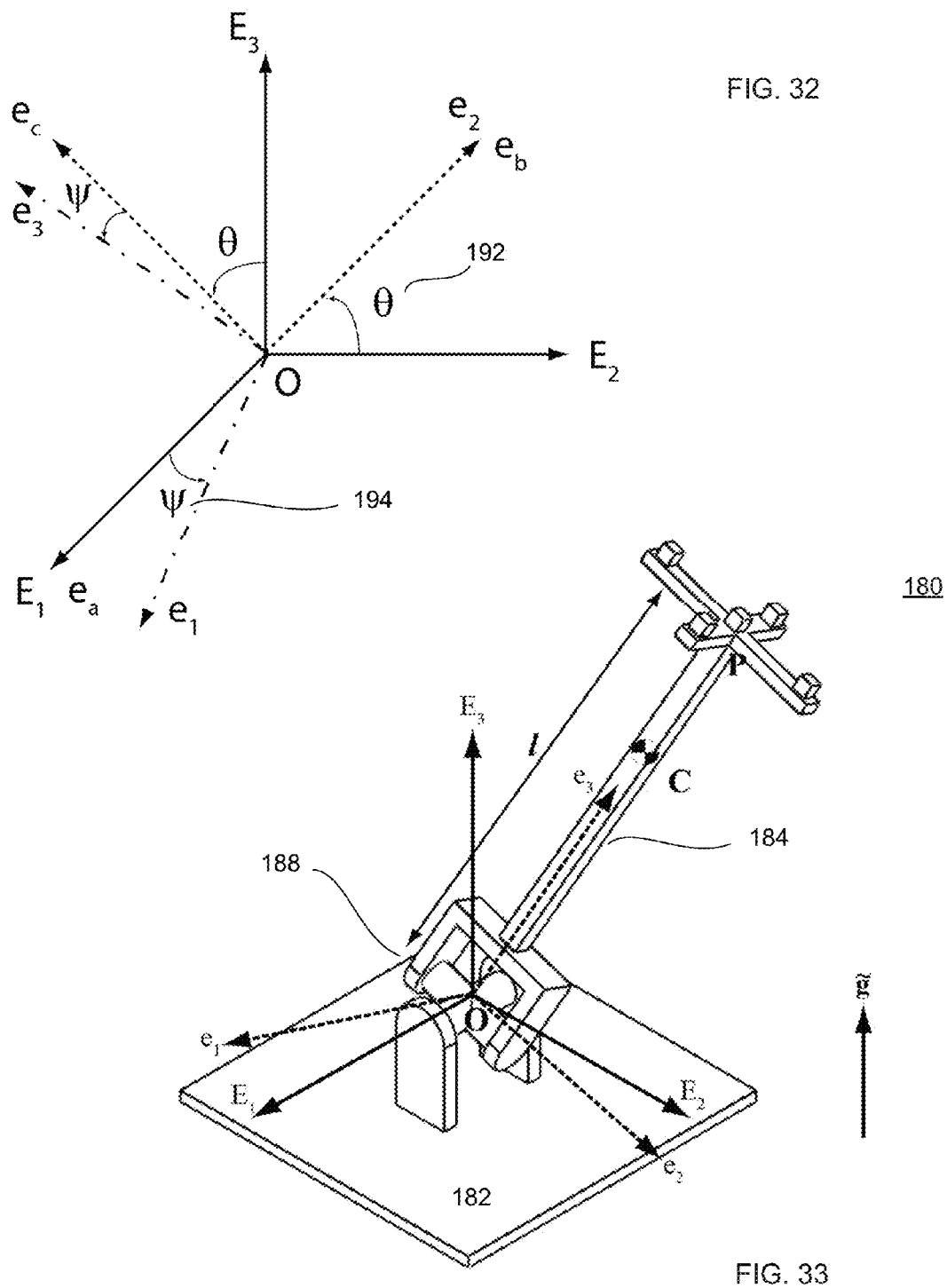
FIG. 32 depicts an intermediate coordinate system defined by orthogonal basis $\{\hat{e}_a, \hat{e}_b, \hat{e}_c\}$.
FIG. 33 is a schematic representation of a robot possessing five degrees of freedom of FIG. 31 and the intermediate coordinate system of FIG. 32.

Intermediate Coordinate System and Rotation Matrices: The rigid body 184 possesses two angular degrees-of-freedom i.e. a minimum of two rotations are required to align the body coordinate system to the Dynamic Equilibrium Coordinate system. An intermediate coordinate system is defined with origin at point O and orthogonal basis $I = \{\hat{e}_a, \hat{e}_b, \hat{e}_c\}$ obtained by rotation of the Dynamic Equilibrium coordinate system with angle θ along the $\hat{E}_1$ axis as shown in FIG. 32. The intermediate coordinate system aligns with the body coordinate system when rotated with angle ψ about axis $\hat{e}_b$. The angular velocity of the body reference frame B in the inertial reference frame N, $^N\omega^B$ may be written as $$^N\omega^B = \dot{\theta}\hat{E}_1 + \dot{\psi}\hat{e}_2 \quad (46)$$

It is worthwhile to mention that the unit vectors $E_1$, $e_2$ are the rotation axes of the Hooke joint at point O. The angular acceleration of reference frame B in reference frame N, $^N a^B$, can be calculated using the transport theorem (A. Rao, "Dynamics of particles and rigid bodies: a systematic approach." *Cambridge Univ Pr*, 2006)

$$^N\alpha^B = \ddot{\theta}\hat{E}_1 + \ddot{\psi}\hat{e}_2 + (^N\omega^B \times (\dot{\psi}\hat{e}_2)) \quad (47)$$

Rotation matrices to transform from basis E to basis I and from basis I to basis e are defined by $^I_E R$ and $^e_I R$ respectively as $$^I_E R = \begin{bmatrix} 1 & 0 & 0 \\ 0 & c_\theta & s_\theta \\ 0 & -s_\theta & c_\theta \end{bmatrix} \quad (48)$$

$$^e_I R = \begin{bmatrix} c_\psi & 0 & -s_\psi \\ 0 & 1 & 0 \\ s_\psi & 0 & c_\psi \end{bmatrix} \quad (49)$$

$$^e_E R = ^e_I R \, ^I_E R \quad (50)$$

where $s_j = \sin(j)$, $c_j = \cos(j)$, $j = \theta, \phi$. Let $^N\omega_e^B$ and $^N\alpha_e^B$ be the matrix representation of the angular velocity and acceleration represented in the basis e. Thus $$
{}^N\omega_e^B = \begin{bmatrix} \dot{\theta} c_\psi \\ \dot{\psi} \\ \dot{\theta} s_\psi \end{bmatrix} \quad (51)
$$

$$
{}^N\alpha_e^B = \begin{bmatrix} \ddot{\theta} c_\psi - \dot{\theta} s_\psi \dot{\psi} \\ \ddot{\psi} \\ \ddot{\theta} s_\psi + \dot{\theta} c_\psi \dot{\psi} \end{bmatrix} \quad (52)
$$

Dynamic Equilibrium Axis for Planar Motion of the Base: For point C on the body 184, performing a kinematic analysis to obtain the linear acceleration in reference frame N (${}^N a_C$) yields $$
{}^N a_C = {}^N a_O + {}^N \alpha^B \times r_{OC} + {}^N \omega^B \times ({}^N \omega^B \times r_{OC}) \quad (53)
$$

where $r_{OC}$ denotes the vector from point O to point C and $$
{}^N a_O = \tilde{g} = \tilde{g} \hat{e}_e \quad (54)
$$

Let the reacting forces acting on the rigid body 184 at the point of contact O be $F_R$. Application of Euler's first and second law (A. Rao, "Dynamics of particles and rigid bodies: a systematic approach." *Cambridge Univ Pr*, 2006) about center of mass C gives $$
m \cdot {}^N a_C = F_R \quad (55)
$$

$$
I_B^C \cdot {}^N \alpha^{B|} = -K_d{}^N \omega^B + r_{CO} \times F_R \quad (56)
$$

At equilibrium ($\ddot{\theta}^* = \dot{\theta}^* = 0$), $\ddot{\psi}^* = \dot{\psi}^* = 0$. Therefore, from Equations 46, 47, 53, 54, 55 and 56, the equilibrium position is $\theta^* = 0$, $\psi^* = 0$ i.e. $r_{co}$ is parallel to $\tilde{g}$. The axis parallel to $\hat{E}_3$ is called the Dynamic Equilibrium Axis (DEA) for planar motion of the base. When the body is aligned along this axis, it is in equilibrium. The DEA is parallel to the resulting acceleration acting at point O (i.e. $\tilde{g}$), thus, is time-varying (more precisely, acceleration varying). It is worthwhile to mention that acceleration of point O is equivalent to the acceleration of the platform 182/surface of contact (e.g. ground). This is similar to the DEA that has been discussed above for robots experiencing one-dimensional motion. The objective for robot balancing applications is to bring the robot to equilibrium i.e. to align the robot along the DEA.

The robot 180 possesses five degrees-of-freedom—two translational (one less due to surface contact) and three rotational. The analysis above shows that the equilibrium position for the robot is not a point or a surface, but an axis called the Dynamic Equilibrium Axis (DEA). Aligning the robot along the axis requires one to move the robot about an equivalent Hooke-joint (two rotational degrees-of-freedom). The orientation of the body 184 about the DEA is irrelevant for robot equilibrium, thus, requiring only two independent parameters (equivalent Hooke-joint) to align the robot 180 along the DEA. It should also be observed that when the robot 180 is not in contact with the platform 182, or ground etc, and experiences free fall, the concept of the DEA ceases to exist as the acceleration experienced by the linear accelerometer at point O is zero i.e. $\tilde{g} = 0$. Theoretically, it reinforces the concept of the DEA as the concept of 'equilibrium position' ceases to exist in zero gravity.

Assuming that the robot 180 has motors/angular actuators that allow the movement of the robot 180 along directions $E_1$ and $e_2/e_b$ (equivalent Hooke-joint), it is desired to find a first inclination angle θ 192 and a second inclination angle ψ 194 as given in FIG. 32 in order to be able to determine an overall inclination with respect to the DEA as disclosed herein, which would be necessary to realign the robot along the DEA.

Figure 34:
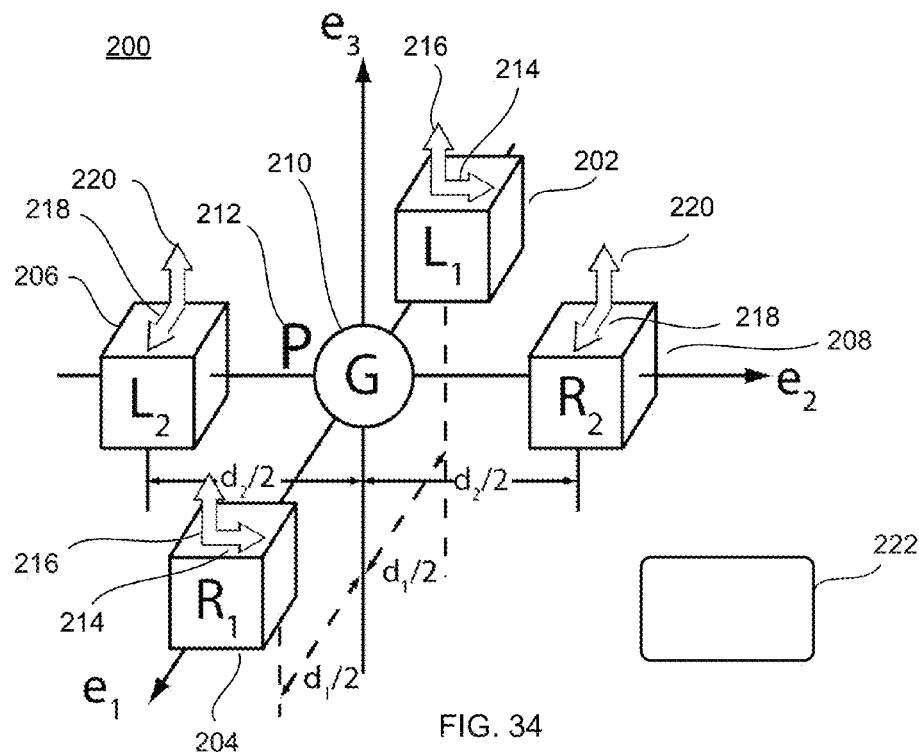
FIG. 34 is a schematic representation of a pVDI.
Figure 35:
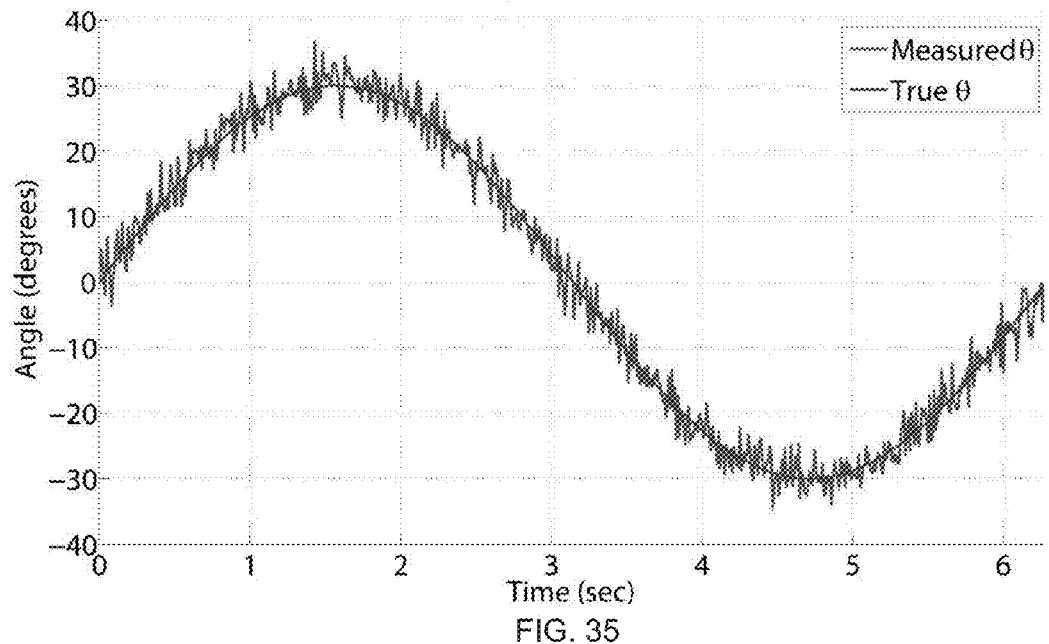
FIG. 35 is a chart of true inclination vs. estimated inclination within a first plane.
Figure 36:
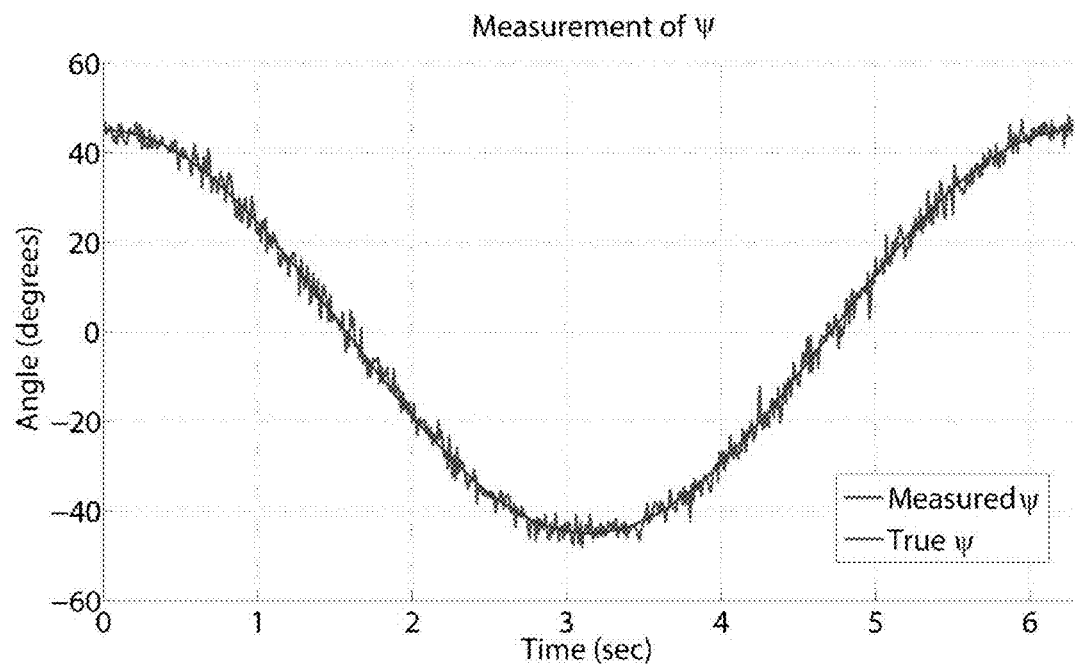
FIG. 36 is a chart of true inclination vs. estimated inclination within a second plane perpendicular to the first plane.
Figure 37:
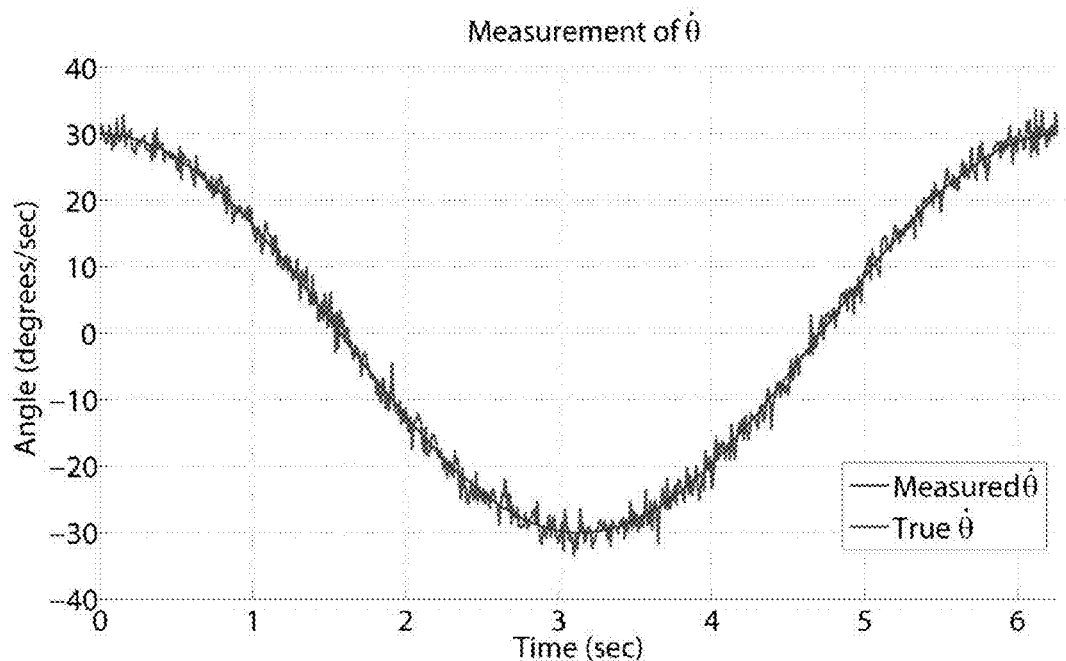
FIG. 37 is a chart of true joint angular velocity vs. observed joint angular velocity about a first axis.
Figure 38:
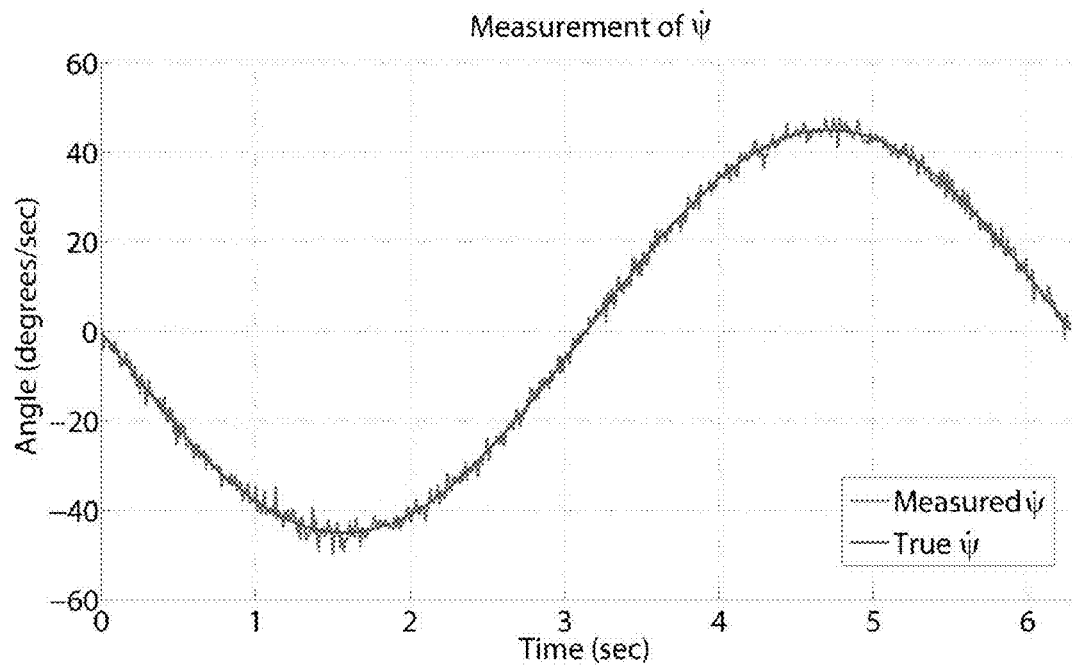
FIG. 38 is a chart of true joint angular velocity vs. observed joint angular velocity about a second axis perpendicular to the first axis.
Figure 39:
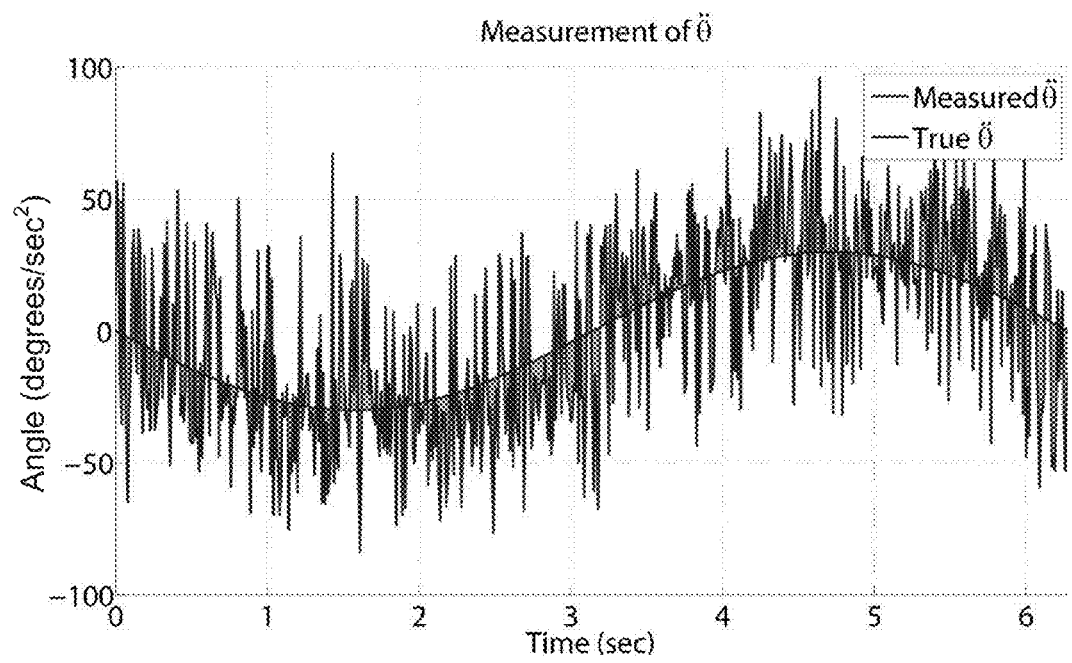
FIG. 39 is a chart of true joint angular acceleration vs. observed joint angular acceleration about a first axis.
Figure 40:
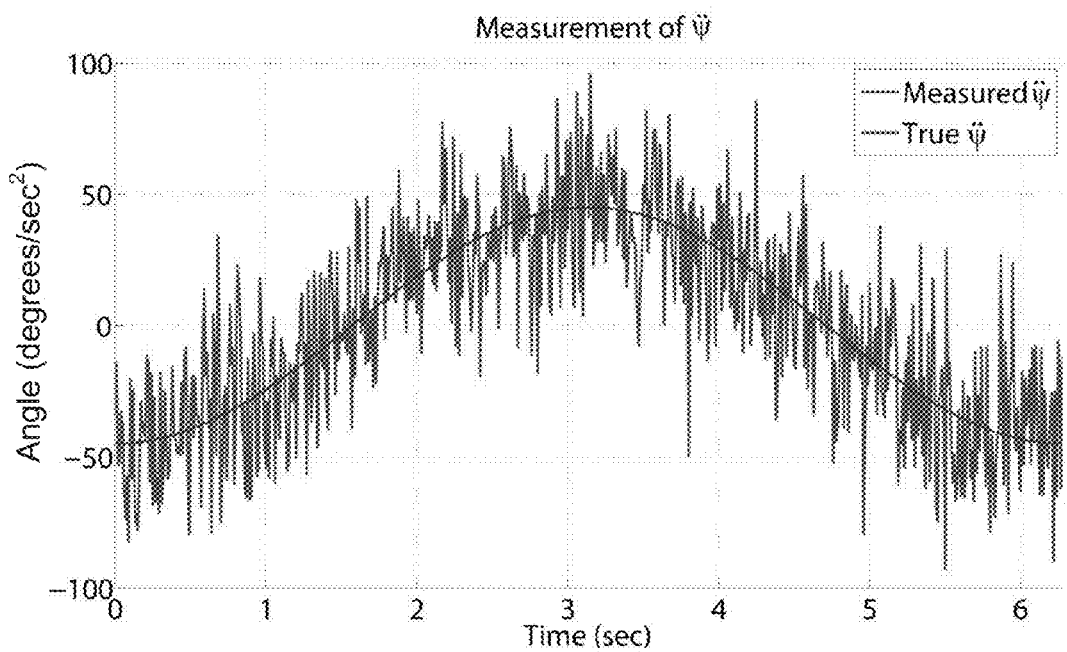
FIG. 40 is a chart of true joint angular acceleration vs. observed joint angular acceleration about a second axis perpendicular to the first axis.
Figure 41:
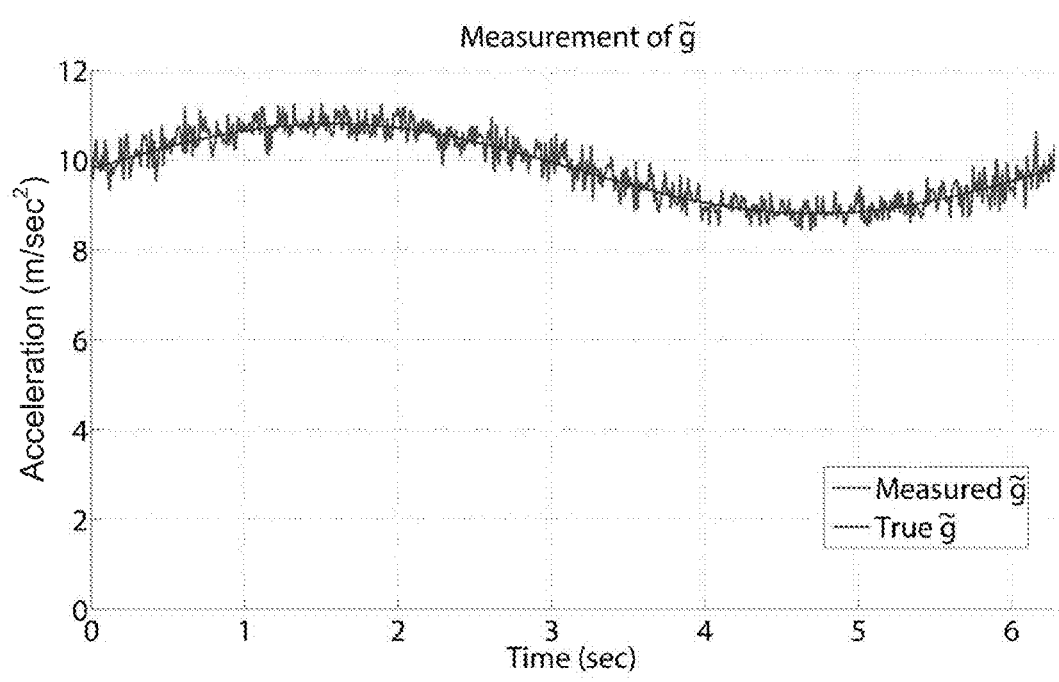
FIG. 41 is a chart of true joint acceleration vs. estimated joint acceleration.

The planar Vestibular Dynamic Inclinometer (pVDI) 200 is designed by strategically and symmetrically placing four dual-axis MEMS linear accelerometers 200, 204, 206, 208 and one tri-axial MEMS gyroscope 210 as shown in FIG. 34. The symmetric placement of the dual axis linear accelerometers 200, 204, 206, 208 in orthogonal directions ($e_1$, $e_2$) facilitates mathematical simplicity. The hollow arrows indicate the directions of the sensitive axes of the dual-axis linear accelerometers 200, 204, 206, 208. Unlike the VDI in FIGS. 7 and 8, the directions of the dual-axis linear accelerometers are different. The location of the sensor is at point P 212 which is at distance l from point O in the $\hat{e}_3$ direction.

$$
r_P = r_O + l \hat{e}_3. \quad (57)
$$

The tri-axial gyroscope 210 is placed at point P 212. First linear accelerometers $L_1$ 202, 204 and $R_1$ are placed symmetrically within the first plane that includes axes $e_1$ and $e_3$ at distance $d_1/2$ along the $\hat{e}_1$ direction about point P 212 and measure the acceleration along $\hat{e}_3$ and $\hat{e}_2$. The first dual axis linear accelerometers 202, 204 each include first axes 214 that are oriented perpendicular to the first plane, (and therefore parallel to each other), and second axes 216 that are within the first plane and parallel to the line of symmetry, which may be axis $e_3$. Similarly, second linear accelerometers $L_2$ 206, 208 and $R_2$ are placed symmetrically within the second plane that includes axes $e_2$ and $e_3$ at distance $d_2/2$ along $\hat{e}_2$ direction about point P 212 and measure the acceleration along $\hat{e}_3$ and $\hat{e}_1$ as shown in FIG. 34. The second dual axis linear accelerometers 206, 208 each include first axes 218 oriented perpendicular to the second plane, (and therefore parallel to each other), and second axes 220 that are within the second plane and parallel to the line of symmetry. The pVDI may include a processor 222 to carry out analysis of the measured data.

Thus $$
r_{OL_1} = l\hat{e}_3 - \frac{d_1}{2}\hat{e}_1 \quad (58)
$$

$$
r_{OR_1} = l\hat{e}_3 + \frac{d_1}{2}\hat{e}_1 \quad (59)
$$

$$
r_{OL_2} = l\hat{e}_3 - \frac{d_2}{2}\hat{e}_2 \quad (60)
$$

$$
r_{OR_2} = l\hat{e}_3 + \frac{d_2}{2}\hat{e}_2. \quad (61)
$$

Kinematic Analysis and Mathematical Manipulations: Acceleration of any point Q on the body can be written as $$
{}^N a_Q = {}^N a_O + ({}^N \alpha^B \times r_{OQ}) + {}^N \omega^B \times ({}^N \omega^B \times r_{OQ}) \quad (62)
$$

where Q may be $\{L_1, R_1, L_2, R_2\}$. Gyroscope and accelerometers sense the angular velocity and linear accelerations in the basis e. The following quantities are defined in terms of the measured accelerometer and gyroscope data as $$
\zeta_1 = \frac{{}^N a_{R_1} - {}^N a_{L_1}}{d_1} \quad (63)
$$

$$
\zeta_2 = \frac{{}^N a_{R_2} - {}^N a_{L_2}}{d_2} \quad (64)
$$

-continued $$\zeta_3 = \frac{{}^N a_{R_2} + {}^N a_{L_2}}{2l} = \frac{{}^N a_{R_1} + {}^N a_{L_1}}{2l} \quad (65)$$

$$\zeta_4 = {}^N \omega_e^B. \quad (66)$$

Simplifying the quantities using Equations 58-61 yields $$\zeta_1 = {}^N \alpha^B \times \hat{e}_1 + {}^N \omega^B \times ({}^N \omega^B \times \hat{e}_1) \quad (67)$$

$$\zeta_2 = {}^N \alpha^B \times \hat{e}_2 + {}^N \omega^B \times ({}^N \omega^B \times \hat{e}_2) \quad (68)$$

$$\zeta_3 = \frac{{}^N a_O}{l} + {}^N \alpha^B \times \hat{e}_3 + {}^N \omega^B \times ({}^N \omega^B \times \hat{e}_3) \quad (69)$$

Inclination Parameter Measurement—Closed Form Solution: Representing equations 66-69 in the basis e i.e. the basis in which the sensor readings are actually observed, is accomplished by using Equations 51, 52 and 54 to obtain $$\zeta_1 = \begin{bmatrix} -\dot{\psi}^2 - \ddot{\theta}\overline{s_\psi} \\ \ddot{\theta}s_\psi + 2\dot{\theta}c_\psi\dot{\psi} \\ -\ddot{\psi} + \dot{\theta}^2 c_\psi s_\psi \end{bmatrix} \quad (70)$$

$$\zeta_2 = \begin{bmatrix} -\ddot{\theta}s_\psi \\ -\dot{\theta}^2 \\ \ddot{\theta}c_\psi \end{bmatrix} \quad (71)$$

$$\zeta_3 = \begin{bmatrix} \ddot{\psi} - (\tilde{g}s_\psi c_\theta)/l + \dot{\theta}^2 c_\psi s_\psi \\ (\tilde{g}s_\theta)/l - \ddot{\theta}c_\psi + 2\dot{\theta}s_\psi\dot{\psi} \\ -\dot{\psi}^2 + (\tilde{g}c_\psi c_\theta)/l - \dot{\theta}^2 c_\psi^2 \end{bmatrix} \quad (72)$$

$$\zeta_4 = \begin{bmatrix} \dot{\theta}c_\psi \\ \dot{\psi} \\ \dot{\theta}s_\psi \end{bmatrix}. \quad (73)$$

The components of the vectors $\zeta_i$, $i=1, 2, 3, 4$, will be referred to as $\zeta_{ij}$, $j=1, 2, 3$. The values that are not observed due to sensor placement are $\zeta_{11}$, $\zeta_{22}$ (striked out in the equations). The mean of the readings of linear accelerometers $\{R_1, L_1\}$ and $\{R_2, L_2\}$ provide $\{\zeta_{32}, \zeta_{33}\}$ and $\{\zeta_{31}, \zeta_{33}\}$ respectively, thus, all three components of $\zeta_3$ are observed.

The terms $\zeta_{ij}$ are manipulated to give seven equations in seven unknowns ($\theta$, $\dot{\theta}$, $\ddot{\theta}$, $\psi$, $\dot{\psi}$, $\ddot{\psi}$, $\tilde{g}$)

$$\ddot{\psi} = -\zeta_{13} + \zeta_{41}\zeta_{43} \quad (74)$$

$$\dot{\psi} = \zeta_{42} \quad (75)$$

$$\dot{\theta}e_\psi = \zeta_{23} \quad (76)$$

$$\tilde{g}s_\psi e_\theta = l(-\zeta_{31} - \zeta_{13} + 2\zeta_{41}\zeta_{43}) \quad (77)$$

$$\tilde{g}s_\theta = l(\zeta_{32} + \zeta_{23} - 2\zeta_{42}\zeta_{43}) \quad (78)$$

$$\dot{\theta}e_\psi = \zeta_{41} \quad (79)$$

$$\dot{\theta}s_\psi = \zeta_{43} \quad (80)$$

Other equations that fall out are $$\ddot{\theta}s_\psi = -\zeta_{21} = -(\zeta_{12} + 2\zeta_{41}\zeta_{42}) \quad (81)$$

$$\tilde{g}e_\psi e_\theta = l(\zeta_{33} + \zeta_{42}^2 + \zeta_{41}^2) \quad (82)$$

The function getVal $(\alpha, \beta_1, \beta_2)$ solves the pair of equations $a \sin(\alpha) = \beta_1$, $a \cos(\alpha) = \beta_2$ for $a$, given $\alpha \in (-\pi/2, \pi/2)$ $$\text{getVal } (\alpha, \beta_1, \beta_2) = \text{sign } (e_\alpha) \cdot \text{sign } (\beta_2) \sqrt{\beta_1^2 + \beta_2^2} \quad (83)$$

Simulation

---

Algorithm 1
Measurement of inclination parameters from sensor data

---

Require: $\{\zeta_{12}, \zeta_{13}\}$, $\{\zeta_{21}, \zeta_{23}\}$, $\zeta_3$, $\zeta_4$
Let $\eta_1, \eta_2, \eta_3$ are defined as follows
  $\eta_1 = l(-\zeta_{31} - \zeta_{13} + 2\zeta_{41}\zeta_{43})$
  $\eta_2 = l(\zeta_{33} + \zeta_{42}^2 + \zeta_{41}^2)$
  $\eta_3 = l(\zeta_{32} + \zeta_{23} - 2\zeta_{42}\zeta_{43})$
Require: $|\eta_1^2 + \eta_2^2| > \epsilon_1$ and $|\eta_1^2 + \eta_2^2 + \eta_3^2| > \epsilon_2$
  $\ddot{\psi} \leftarrow (-\zeta_{13} + \zeta_{41}\zeta_{43})$
  $\dot{\psi} \leftarrow \zeta_{42}$
  $\psi \leftarrow \tan^{-1}\left(\frac{\eta_1}{\eta_2}\right)$
  $\psi \in (-\pi/2, \pi/2)$
  $\dot{\theta} \leftarrow \text{getVal } (\psi, \zeta_{43}\zeta_{41})$
  $\ddot{\theta} \leftarrow \text{getVal } \left(\psi, \left(\left(\frac{\zeta_{12} - \zeta_{21}}{2}\right) - \zeta_{41}\zeta_{43}\right), \zeta_{23}\right)$
  Let $\eta_4 = \text{getVal } (\psi, \eta_1, \eta_2)$
  $\theta \leftarrow \text{atan2}(\eta_3, \eta_4)$
  $\theta \in (-\pi, \pi]$
  $\tilde{g} \leftarrow \text{getVal } (\theta, \eta_3, \eta_4)$ Simulations were performed in MATLAB®. The sensor noise was modeled as stationary white noise which is constant throughout the frequency spectrum based on the specification data sheet of accelerometer ADXL213 (noise density of 160 μg/√Hz rms) and gyroscope ADXRS450 (noise density of 0.015 o/sec/√Hz) manufactured by Analog Devices. The frequency of operation of the sensors is assumed to be 10 Hz. It should be indicated that when $\tilde{g}$ is zero, the concept of the DEA ceases to exist. In such cases, measurement for inclination parameters is invalid. The case $\theta = \pi/2$ is not possible as $e_b/e_2$ aligns with $e_3$ after the first rotation and no possible rotation along $e_2$ can align $e_c$ with $e_3$. So, the possibility of measurement of inclination parameters exists only when $\tilde{g}c_\theta \neq 0$. The simulation results are very good and encouraging. One set of simulation results are shown in FIGS. 35, 36, 37, 38, 39, 40, and 41. For this set, $l=1$ m, $d_1 = d_2 = 0.25$ m. The measurements for $\theta$, $\dot{\theta}$, $\ddot{\theta}$, $\psi$, $\dot{\psi}$, $\ddot{\psi}$, and $\tilde{g}$ have a standard deviations of 2.42 deg, 2.28 deg, 1.6 deg/sec, 1.5 rad/sec, 25 rad/sec$^2$, 20 rad/sec$^2$ and 0.27 m/sec$^2$ respectively. Very high noise is observed in the measurement of angular acceleration (FIGS. 39, 40) and it is suggested to use filtering techniques to obtain better results. Apart from the angular acceleration, the measurements do not 'drift' over time as it does not involve integration of the quantities. The simulations show that the measurement solutions obtained are accurate, reliable and stable. The accuracy of the measurements also indicates that there is no coupling effect on measurements due to placement of robot mechanism.

Figure 42:
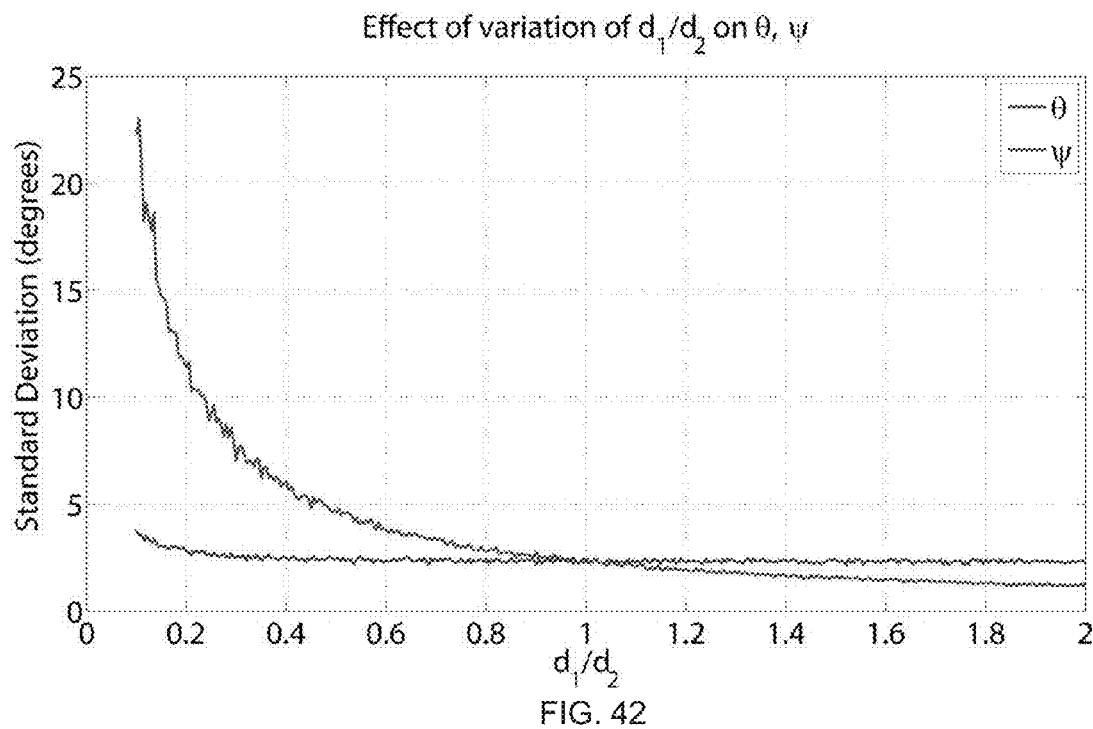
FIG. 42 is a chart of the effect of variation in $d_1/d_2$ on inclinations in both planes.
Figure 43:
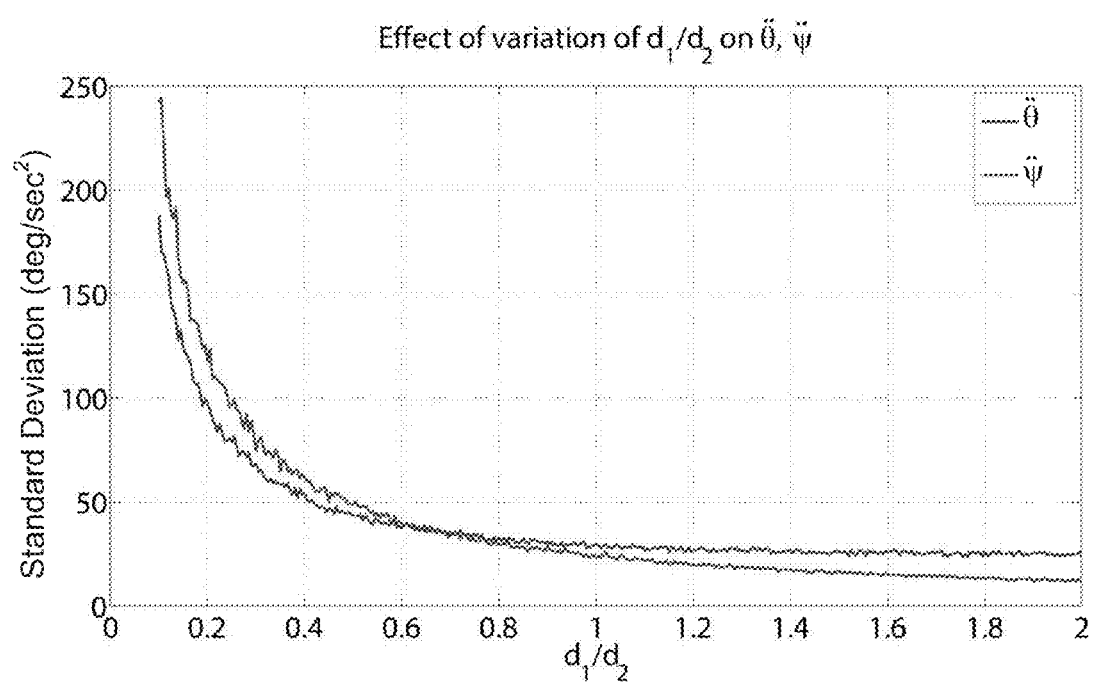
FIG. 43 is a chart of the effect of variation in $d_1/d_2$ on angular acceleration about both axes.
Figure 44:
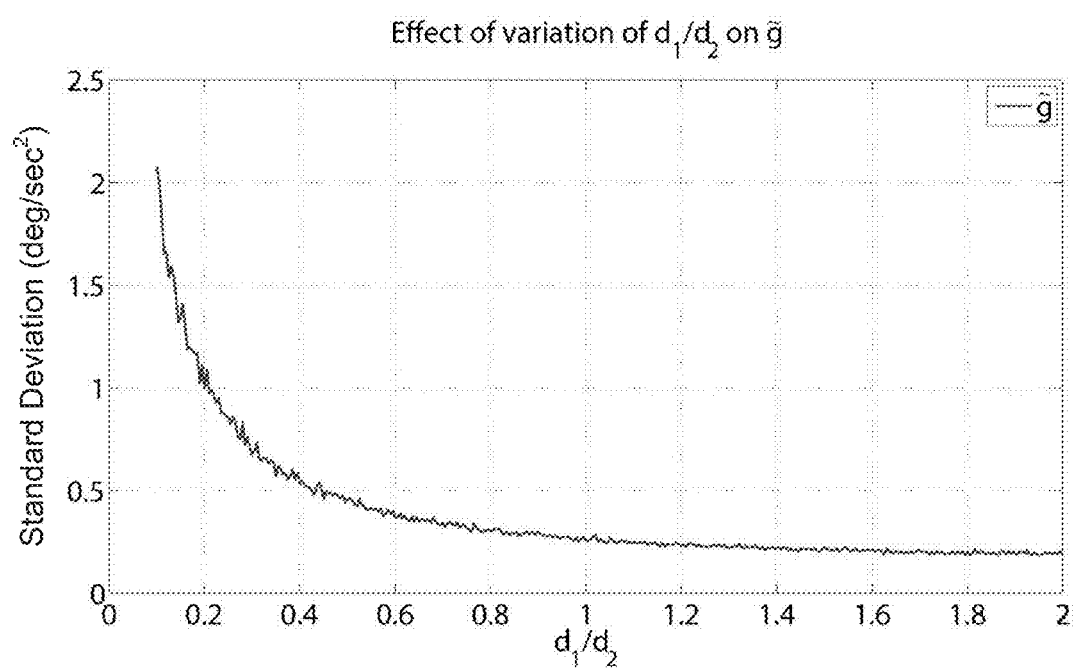
FIG. 44 is a chart of the effect of variation in $d_1/d_2$ on joint acceleration.

It is desired to analyze for optimum $d_1$, $d_2$. This is equivalent to analyzing optimality for $l/d_2$ and $d_1/d_2$. Simulations show that variation of $l/d_2$ has little effect on the any of the measurements and variation of $d_1/d_2$ has little effect on measurements of $\dot{\theta}$, $\dot{\psi}$. FIGS. 42, 43 44 plot the variation of $d_1/d_2$ to measurement of angles, angular acceleration and acceleration of surface of contact respectively. Analysis from the FIGS. shows that $d_1/d_2=1$ is a good ratio for sensor design.

Thus, the inclination parameters measured from the pVDI relative to the DEA are inclination angle, angular velocity, angular acceleration and magnitude of the resultant acceleration acting at the platform/surface of contact. The angular acceleration measurements are observed to have very high noise, thus are not accurate without additional filtering. The other inclination parameter measurements are independent of sensor array location, not subject to 'drift' and integration errors, and valid for large inclination angles. The measurements are also independent of the acceleration of the platform/surface of contact, thus, are valid for environments with varying gravity (space applications) and accelerating platforms (running, walking motion of robots, etc.). The sensor outputs are ideal control inputs for balancing of robots as the goal is to bring the robots to the equilibrium position (i.e. align it along the DEA). This makes the pVDI ideal for balancing of robots, humanoids, etc.

It can be seen that a novel IMU called a pVDI utilizes a unique configuration of ubiquitous MEMS components such that only kinematic analysis (no calculus or dynamic modeling) is necessary in order to ascertain inclination parameters. As a result the pVDI is relatively inexpensive, does not suffer from drift associated with all other known IMUs, computation costs are low due to the utilization of closed form solutions and lack of need for Kalman or similar type filters, and the data is valid for large angles. This VDI enables a unique concept known as DEA, which references a body's inclination parameters from an axis of stability, whatever the inclination angle(s) of that axis of stability may be. As a result, the inclination parameters are not gravity dependent. Further, the concepts that enable the VDI can be expanded to enable the pVDI, which models five degree of freedom robots, and the DEA associated therewith. Advantageously, the neither the VDI nor the pVDI need to be placed exactly at a joint, which offers design flexibility. For all these reasons the cost of making the VDI is greatly reduced relative to the prior art IMUs.

Further, the introduction of the concept of Dynamic Equilibrium Axis (DEA) related to dynamic equilibrium of robots may improve upon contributions currently resulting from the known concept of the Zero Moment Point (ZMP), used for equilibrium analysis and motion planning of biped locomotion. The ZMP plays and important role for gait analysis, synthesis and control. The DEA is foreseen to be helpful in theoretical consideration and practical development of fast speed running robots.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

REFERENCES

[1] Algrain, M. C. and Saniie, J. "Estimation of 3D angular motion using gyroscopes and linear accelerometers." *Aerospace and Electronic Systems, IEEE Transactions on* 27 (1991).6: 910-920.

[2] Bachmann, E. R. and C A., NAVAL POSTGRADUATE SCHOOL MONTEREY. *Inertial and magnetic tracking of limb segment orientation for inserting humans into synthetic environments.* Citeseer, 2000.

[3] Baerveldt, A. J. and Kiang, R. "A low-cost and low-weight attitude estimation system for an autonomous helicopter." 1997 *IEEE International Conference on Intelligent Engineering Systems.* 1997, 391-395.

[4] Barshan, B. and Durrant-Whyte, H. F. "Inertial navigation systems for mobile robots." *Robotics and Automation, IEEE Transactions on* 11 (1995).3: 328-342.

[5] Baselli, G., Legnani, G., Franco, P., Brognoli, F., Marras, A., Quaranta, F., and Zappa, B. "Assessment of inertial and gravitational inputs to the vestibular system." *Journal of Biomechanics* 34 (2001).6: 821-826.

[6] Baxter, Larry K. *Capacitive Sensors: Design and Applications (IEEE Press Series on Electronics Technology).* Wiley-IEEE Press, 1996.

[7] Bernmark, E. and Wiktorin, C. "A triaxial accelerometer for measuring arm movements." *Applied Ergonomics* 33 (2002).6: 541-547.

[8] Bernstein, J. "An overview of MEMS inertial sensing technology." *Sensors-the Journal of Applied Sensing Technology* 20 (2003).2: 14-21.

[9] Billat, S., Glosch, H., Kunze, M., Hedrich, F., Frech, J., Auber, J., Lang, W., Sandmaier, H., and Wimmer, W. "Convection-based micromachined inclinometer using SOI technology." *Micro Electro Mechanical Systems, 2001. MEMS 2001. The 14th IEEE International Conference on.* IEEE, 2001, 159-161.

[10] Bortz, J. E. "A new mathematical formulation for strapdown inertial navigation." *Aerospace and Electronic Systems, IEEE Transactions on* (1971).1: 61-66.

[11] Bouten, C. V. C., Koekkoek, K. T. M., Verduin, M., Kodde, R., and Janssen, J. D. "A triaxial accelerometer and portable data processing unit for the assessment of daily physical activity." *Biomedical Engineering, IEEE Transactions on* 44 (1997).3: 136-147.

[12] Brandt, T. *Vertigo: its multisensory syndromes.* Springer Verlag, 1999.

[13] Chen, J. H., Lee, S. C., and DeBra, D. B. "Gyroscope free strapdown inertial measurement unit by six linear accelerometers." *Journal of Guidance, Control, and Dynamics* 17 (1994).2: 286-290.

[14] Cheng, Peng and Oelmann, B. "Joint-Angle Measurement Using Accelerometers and Gyroscopes—A Survey." *Instrumentation and Measurement, IEEE Transactions on* 59 (2010).2: 404-414.

[15] Corazza, S., Mundermann, L., Chaudhari, A M, Demattio, T., Cobelli, C., and Andriacchi, T P. "A markerless motion capture system to study musculoskeletal biomechanics: Visual hull and simulated annealing approach." *Annals of Biomedical Engineering* 34 (2006).6: 1019-1029.

[16] Dejnabadi, H., Jolles, B. M., and Aminian, K. "A new approach to accurate measurement of uniaxial joint angles based on a combination of accelerometers and gyroscopes." *Biomedical Engineering, IEEE Transactions on* 52 (2005).8: 1478-1484.

[17] Foxlin, E. "Inertial head-tracker sensor fusion by a complimentary separate-bias kalman filter." *Virtual Reality Annual International Symposium.* Published by the IEEE Computer Society, 1996, 185.

[18] Ghassemi, F., Tafazoli, S., Lawrence, P D, and Hashtrudi-Zaad, K. "An accelerometer-based joint angle sensor for heavy-duty manipulators." *Robotics and Automation, 2002. Proceedings. ICRA '02. IEEE International Conference on.* vol. 2. IEEE, 2002, 1771-1776.

[19] Ghassemi, F., Tafazoli, S., Lawrence, P. D., and Hashtrudi-Zaad, K. "Design and Calibration of an Integration- Free Accelerometer-Based Joint-Angle Sensor." *Instrumentation and Measurement, IEEE Transactions on* 57 (2007).1: 150-159.

[20] Horak, F. B. and Macpherson, J. M. "Postural orientation and equilibrium." *Comprehensive Physiology* (1996).

[21] IGNAGNI, M B. "OPTIMAL STRAPDOWN ATTITUDE INTEGRATION ALGORITHMS." *JOURNAL OF GUIDANCE CONTROL AND DYNAMICS* 13 (1990).2: 363-369.

[22] Jiang, Y. F. and Lin, Y. P. "Improved strapdown coning algorithms." *Aerospace and Electronic Systems, IEEE Transactions on* 28 (1992).2: 484-490.

[23] Kalman, R. E. et al. "A new approach to linear filtering and prediction problems." *Journal of basic Engineering* 82 (1960).1: 35-45.

[24] Kemp, B., Janssen, A. J. M. W., and van der Kamp, B. "Body position can be monitored in 3D using miniature accelerometers and earth-magnetic field sensors." *Electroencephalography and Clinical Neurophysiology/Electromyography and Motor Control* 109 (1998).6: 484-488.

[25] King, A D. "Inertial navigation-forty years of evolution." *GEC review* 13 (1998).3:140-149.

[26] Kurata, S., Makikawa, M., Kobayashi, H., Takahashi, A., and Tokue, R. "Joint motion monitoring by accelerometers set at both near sides around the joint." *Engineering in Medicine and Biology Society,* 1998. *Proceedings of the 20th Annual International Conference of the IEEE.* vol. 4. 1998, 1936-1939 vol.4.

[27] Lapadatu, D., Habibi, S., Reppen, B., Salomonsen, G., and Kvisteroy, T. "Dual- axes capacitive inclinometer/low-g accelerometer for automotive applications." *Micro Electro Mechanical Systems,* 2001. *MEMS* 2001. *The 14th IEEE International Conference on.* IEEE, 2001, 34-37.

[28] Laurens, J. and Droulez, J. "Bayesian processing of vestibular information." *Biological cybernetics* 96 (2007).4: 389-404.

[29] Cotters, J C, Schipper, J., Veltink, P H, Olthuis, W., and Bergveld, P. "Procedure for in-use calibration of triaxial accelerometers in medical applications." *Sensors and Actuators A: Physical* 68 (1998).1-3: 221-228.

[30] Luinge, H. J. and Veltink, P. H. "Inclination measurement of human movement using a 3-D accelerometer with autocalibration." *Neural Systems and Rehabilitation Engineering, IEEE Transactions on* 12 (2004).1: 112-121.

[31] Luinge and Veltink. "Measuring orientation of human body segments using miniature gyroscopes and accelerometers." *Medical and Biological Engineering and Computing* 43 (2005).2: 273-282.

[32] Mayagoitia, R. E., Nene, A. V., and Veltink, P. H. "Accelerometer and rate gyroscope measurement of kinematics: an inexpensive alternative to optical motion analysis systems." *Journal of biomechanics* 35 (2002).4: 537-542.

[33] Mergner, T., Schweigart, G., and Fennell, L. "Vestibular humanoid postural control." *Journal of Physiology-Paris* 103 (2009).3-5: 178-194.

[34] Mergner, T., Schweigart, G., Maurer, C., and Brumle, A. "Human postural responses to motion of real and virtual visual environments under different support base conditions." *Experimental brain research* 167 (2005).4: 535-556.

[35] Miyazaki, S. "Long-term unrestrained measurement of stride length and walking velocity utilizing a piezoelectric gyroscope." *Biomedical Engineering, IEEE Transactions on* 44 (1997).8: 753-759.

[36] Moe-Nilssen, R. "A new method for evaluating motor control in gait under real-life environmental conditions. Part 1: The instrument." *Clinical Biomechanics* 13 (1998).4-5: 320-327.

[37] Moe-Nilssen, R. and Helbostad, J. L. "Trunk accelerometry as a measure of balance control during quiet standing." *Gait & posture* 16 (2002).1: 60-68.

[38] Moeslund, T. B., Hilton, A., and Kruger, V. "A survey of advances in vision-based human motion capture and analysis." *Computer vision and image understanding* 104 (2006).2-3: 90-126.

[39] Najafi, B., Aminian, K., Loew, F., Blanc, Y., and Robert, P. A. "Measurement of stand-sit and sit-stand transitions using a miniature gyroscope and its application in fall risk evaluation in the elderly." *Biomedical Engineering, IEEE Transactions on* 49 (2002).8: 843-851.

[40] Nebot, E. and Durrant-Whyte, H. "Initial calibration and alignment of low-cost inertial navigation units for land vehicle applications." *Journal of Robotic Systems* 16 (1999).2: 81-92.

[41] Pappas, I. P. I., Popovic, M. R., Keller, T., Dietz, V., and Morari, M. "A reliable gait phase detection system." *Neural Systems and Rehabilitation Engineering, IEEE Transactions on* 9 (2001).2: 113-125.

[42] Patane, F., Laschi, C., Miwa, H., Guglielmelli, E., Dario, P., and Takanishi, A. "Design and development of a biologically-inspired artificial vestibular system for robot heads." *Intelligent Robots and Systems,* 2004. (*IROS* 2004). *Proceedings.* 2004 *IEEE/RSJ International Conference on.* vol. 2. 2004, 1317-1322 vol.2.

[43] Pope, M H, BEVINS, T., WILDER, D. G., and Frymoyer, J W. "The relationship between anthropometric, postural, muscular, and mobility characteristics of males ages 18-55." *Spine* 10 (1985).7: 644.

[44] Poppe, R. "Vision-based human motion analysis: An overview." *Computer Vision and Image Understanding* 108 (2007).1-2: 4-18.

[45] Powell, W. B. and Pheifer, D. "The Electrolytic Tilt Sensors." *Sensors-May* (2000).

[46] Rabbitt, R., Damiano, E., and Grant, J. "Biomechanics of the semicircular canals and otolith organs." *The vestibular system* (2004): 153-201.

[47] Rhodes, I. "A tutorial introduction to estimation and filtering." *Automatic Control, IEEE Transactions on* 16 (1971).6: 688-706.

[48] Roetenberg, D. "Inertial and magnetic sensing of human motion." (2006).

[49] Schuler, A. R., Grammatikos, A., and Fegley, K. A. "Measuring rotational motion with linear accelerometers." *IEEE Trans. on AES* 3 (1967).3: 465-472.

[50] Steultjens, M P M, Dekker, J., Van Baar, M E, Oostendorp, R A B, and Bijlsma, J W J. "Range of joint motion and disability in patients with osteoarthritis of the knee or hip." *Rheumatology* 39 (2000).9: 955.

[51] Tahboub, K. A. "Optimal estimation of body angular velocity based on otolith-canal interaction." *Control and Automation,* 2008 16*th Mediterranean Conference on.* IEEE, ????, 848-853.

[52] Tong, K. and Granat, M. H. "A practical gait analysis system using gyroscopes." *Medical engineering & physics* 21 (1999).2: 87-94.

[53] Vaganay, J., Aldon, M J, and Fournier, A. "Mobile robot attitude estimation by fusion of inertial data." 1993 *IEEE International Conference on Robotics and Automation,* 1993. *Proceedings.* 1993, 277-282.

[54] van den Bogert, A. J., Read, L., and Nigg, B. M. "A method for inverse dynamic analysis using accelerometry." *Journal of biomechanics* 29 (1996).7: 949-954.

[55] Veltink, P. H., Luinge, H. J., Kooi, B. J., Baten, C. T. M., Slycke, P., Olthuis, W., and Bergveld, P. "The artificial vestibular system-design of a tri-axial inertial sensor system and its application in the study of human movement." *Control of Posture and Gait, Proceedings of the International Society for Postural and Gait Research ISPG* (2001).

[56] Veltink, P. H., Martens, L J, and Van Lummel, R. C. "Detection of static and dynamic activities using uniaxial accelerometers." *IEEE Transactions on Rehabilitation Engineering* 4 (1996).4: 375.

[57] Vukobratovic, M. and Borovac, B. "Zero-moment point-thirty five years of its life." *International Journal of Humanoid Robotics* 1 (2004).1: 157-173.

[58] Willemsen, A. T. M., Frigo, C., and Boom, H. B. K. "Lower extremity angle measurement with accelerometers-error and sensitivity analysis". *Biomedical Engineering, IEEE Transactions on*, 38(12), pp. 1186-1193.

[59] T. Mergner, G. Schweigart, and L. Fennell, "Vestibular humanoid postural control," *Journal of Physiology-Paris,* vol. 103, no. 3-5, pp. 178-194, 2009.

[60] V. Vikas, J. Godowski, and C. Crane, "Balancing robots using vestibular dynamic inclinometer," in *Florida Conference on Recent Advances in Robotics,* May 2010.

[61] H. Luinge, "Inertial sensing of human movement," Unpublished PhD, University of Twente, Enschede, the Netherlands, 2002.

[62] H. Luinge and P. Veltink, "Measuring orientation of human body segments using miniature gyroscopes and accelerometers," *Medical and Biological Engineering and Computing*, vol. 43, no. 2, pp. 273-282, 2005.

[63] V. Vikas and C. Crane, "Robot inclination estimation using vestibular dynamic inclinometer," in *International Conference on Robotics and Applications* (accepted). ACTA Press, November 2010.

[64] A. Rao, "Dynamics of particles and rigid bodies: a systematic approach." Cambridge Univ Pr, 2006.

[65] H. Khalil, "Nonlinear systems", 3rd ed. Upper Saddle River, N.J. Prentice Hall, 2001.

[66] Williamson, R., and Andrews, B., 2001. "Detecting absolute human knee angle and angular velocity using accelerometers and rate gyroscopes". *Medical and Biological Engineering and Computing,* 39(3), pp. 294-302.

[67] Vikas, V., and Crane, C., 2010. "Robot inclination estimation using vestibular dynamic inclinometer". In IASTED International Conference Robotics

[68] Vikas, V. and Crane, C., "Inclination estimation and balance of robot using vestibular dynamic inclinometer," in IEEE-RAS International Conference on Humanoid Robots, December 2010, pp. 245-250.

The invention claimed is:

1. A method of determining orientation parameters of a rigid body, comprising:

assocating at least two multi-axis accelerometers with the body, wherein the body comprises a base end, a distal end, and a line of symmetry of the body between the base end and the distal end, wherein two first multi-axis accelerometers are disposed at a first point along the line of symmetry between the base end and the distal end, wherein each first multi-axis accelerometer is disposed at equal distances from the line of symmetry, and wherein the line of symmetry and both first multi-axis accelerometers lie in a first plane;

associating a gyroscope with the body, wherein the gyroscope is spaced apart from the two multi-axis accelerometers;

gathering measured data from the two first multi-axis accelerometers and the gyroscope;

applying analysis free of calculus to the measured data to determine a first inclination angle of the line of symmetry from a dynamic equilibrium axis, wherein the dynamic equilibrium axis is parallel to a direction of a total acceleration at a point of contact on the body, wherein the total acceleration is a vector sum of a first acceleration and a second acceleration acting on the body.

2. The method of claim 1, further comprising applying the analysis free of calculus to determine a magnitude of the total acceleration acting on the body.

3. The method of claim 1, wherein the first acceleration is gravity and the second acceleration is an acceleration other than gravity.

4. The method of claim 3, further comprising:

associating two second multi-axis accelerometers at the first point, wherein each second multi-axis accelerometer is disposed at equal distances from the line of symmetry, and wherein the line of symmetry and both second multi-axis accelerometers lie in a second plane that is perpendicular to the first plane; and determining a second inclination angle, wherein the base end is constrained to move on a third surface transverse to the first plane and the second plane;

wherein the first plane and the second plane intersect each other at the base end, wherein the body is free to rotate and limited to movement in the first plane and in the second plane, and wherein the first inclination angle and the second inclination angle determine an overall inclination from the dynamic equilibrium axis.

5. The method of claim 4, wherein each first multi-axis accelerometer comprises a first axis oriented perpendicular to the first plane and a second axis within the first plane and parallel to the line of symmetry, and wherein each second multi-axis accelerometer comprises a first axis oriented perpendicular to the second plane and a second axis within the second plane and parallel to the line of symmetry.

6. The method of claim 5, wherein the first multi-axis accelerometers and the two second multi-axis accelerometers comprise dual axis accelerometers.

7. The method of claim 1, wherein the body moves within the first plane, wherein the dynamic equilibrium axis is disposed within the first plane, and wherein the first inclination angle is within the first plane.

8. The method of claim 7, wherein first axes of the first multi-axis accelerometers are disposed within the first plane and are perpendicular to the line of symmetry, and wherein second axes of the first multi-axis accelerometers are disposed within the first plane and are parallel to the line of symmetry.

9. The method of claim 8, wherein the first multi-axis accelerometers comprise dual axis accelerometers.

10. The method of claim 1, wherein the gyroscope comprises a single axis gyroscope.

11. The method of claim 1, wherein measured data is sampled as discrete sets of measured data over time, and wherein inclination parameters are determined as a set of inclination parameters derived solely from a respective set of measured data.

12. The method of claim 1, wherein the gyroscope is disposed along the line of symmetry.

13. An apparatus for determining inclination parameters of a body, comprising:
- a gyroscope configured to be disposed along a line of symmetry between a base end and a distal end of the body;
- at least two multi-axis accelerometers configured to be secured with respect to a first point along the line of symmetry such that two first multi-axis accelerometers are disposed symmetrically about the first point, and the line of symmetry and the two first multi-axis accelerometers lie in a first plane; and
- a processor configured to determine an inclination angle of the body with respect to a dynamic equilibrium angle that is parallel to a direction of a total acceleration acting on the body, wherein the total acceleration comprises gravity and may or may not comprise an acceleration other than gravity.

14. The apparatus of claim 13, wherein when the body is configured such that a movement of the body is limited to the first plane, each of the first multi-axis accelerometers comprise first axes disposed within the first plane and perpendicular to the line of symmetry and second axes disposed within the first plane and parallel to the line of symmetry.

15. The apparatus of claim 14, wherein the two first multi-axis accelerometers, and the gyroscope comprises a tri-axial gyroscope.

16. An apparatus for determining inclination parameters of a body, comprising:
- a gyroscope configured to be disposed on the body;
- at least two multi-axis accelerometers configured to be secured with respect to a first point along a line of symmetry of the body such that two first multi-axis accelerometers are disposed symmetrically about the first point, and the line of symmetry and the two first multi-axis accelerometers lie in a first plane; and
- two second multi-axis accelerometers configured to be secured with respect to the first point such that the two second multi-axis accelerometers are disposed symmetrically about the first point, and the line of symmetry and the two second multi-axis accelerometers lie in a second plane perpendicular to the first plane.

17. The apparatus of claim 16, wherein when the body is configured such that a movement of the base end is limited to a surface transverse to the first plane and the second plane, the first plane and the second plane intersect each other at the base end, the body is free to rotate and movement is of the body is limited to the first plane and the second plane, and
- wherein each first multi-axis accelerometer comprises a first axis oriented perpendicular to the first plane and a second axis within the first plane and parallel to the line of symmetry, and each second multi-axis accelerometer comprises a first axis oriented perpendicular to the second plane and a second axis within the second plane and parallel to the line of symmetry.

18. The apparatus of claim 17, wherein the two first multi-axis accelerometers comprise dual axis accelerometers.

* * * * *